(12) United States Patent
Her et al.

(10) Patent No.: US 11,140,791 B2
(45) Date of Patent: Oct. 5, 2021

(54) ELECTRONIC DEVICE INCLUDING SENSOR MOUNTED BELOW DISPLAY PANEL

(71) Applicant: SAMSUNG ELECTRONICS CO., LTD., Suwon-si (KR)

(72) Inventors: Yongkoo Her, Suwon-si (KR); Byungduk Yang, Suwon-si (KR); Songhee Jung, Suwon-si (KR); Hyunchang Shin, Suwon-si (KR); Joongyu Lee, Suwon-si (KR); Jaeseung Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 52 days.

(21) Appl. No.: 16/594,583

(22) Filed: Oct. 7, 2019

(65) Prior Publication Data

US 2020/0113069 A1    Apr. 9, 2020

(30) Foreign Application Priority Data

Oct. 5, 2018    (KR) .................... 10-2018-0119349

(51) Int. Cl.
*G02B 1/11* (2015.01)
*H05K 5/00* (2006.01)
(Continued)

(52) U.S. Cl.
CPC .......... *H05K 5/0017* (2013.01); *G02F 1/133* (2013.01); *H05K 5/02* (2013.01); *G06F 3/047* (2013.01)

(58) Field of Classification Search
CPC .. G02B 1/10; G02B 1/11; G02F 1/133; G02F 1/13312; G02F 1/133512; G02F 1/136209;
(Continued)

(56) References Cited

U.S. PATENT DOCUMENTS 10,409,337  B2    9/2019   Jin
10,503,297  B2    12/2019  Zeng et al.
(Continued)

FOREIGN PATENT DOCUMENTS

CN    106817451        6/2017
CN    106817451   A    6/2017
(Continued)

OTHER PUBLICATIONS

Search Report and Written Opinion dated Jan. 20, 2020 in counterpart International Patent Application No. PCT/KR2019/013134.
(Continued)

*Primary Examiner* — Michael J Eurice
(74) *Attorney, Agent, or Firm* — Nixon & Vanderhye P.C.

(57) ABSTRACT

Disclosed is an electronic device. An electronic device according to various embodiments may include an optical sensor and a display panel. The display panel may include a first substrate, a second substrate, a pixel layer disposed between the first substrate and the second substrate, the pixel layer having at least one opening in at least a portion thereof, and a light-transmissive member comprising a light-transmissive material disposed in at least a portion of the opening and having a second reflective index corresponding to a first reflective index of the second substrate. The optical sensor may be disposed below the second substrate and at least partially overlap a predetermined area of the display panel corresponding to the opening.

16 Claims, 25 Drawing Sheets

(51) Int. Cl.
  *H05K 5/02* (2006.01)
  *G02F 1/133* (2006.01)
  *G06F 3/047* (2006.01)

(58) Field of Classification Search
  CPC ...... G06F 1/1637; G06F 1/1686; G06F 3/047; H01J 2229/8913; H01J 29/896; H01L 31/02164; H01L 51/5284; H05K 5/0017; H05K 5/02; H04M 1/0266
  See application file for complete search history.

(56) References Cited

U.S. PATENT DOCUMENTS

| | | | |
|---|---|---|---|
| 2002/0154379 A1* | 10/2002 | Tonar | F21S 45/47 359/267 |
| 2011/0032443 A1* | 2/2011 | Cho | H04N 5/335 349/41 |
| 2012/0257123 A1 | 10/2012 | Lee | |
| 2013/0258234 A1 | 10/2013 | Park et al. | |
| 2013/0313672 A1 | 11/2013 | Min | |
| 2014/0063433 A1* | 3/2014 | Benson | G02F 1/133308 349/155 |
| 2017/0068287 A1 | 3/2017 | Jung et al. | |
| 2017/0316740 A1 | 11/2017 | Yang et al. | |
| 2018/0059298 A1 | 3/2018 | Lee et al. | |
| 2019/0050094 A1 | 2/2019 | Zeng et al. | |
| 2020/0341314 A1 | 10/2020 | Jung et al. | |

FOREIGN PATENT DOCUMENTS

| | | |
|---|---|---|
| EP | 3 787 055 A1 | 3/2021 |
| KR | 10-2017-0105700 | 9/2017 |
| WO | WO 2020/218856 | 10/2020 |

OTHER PUBLICATIONS

Extended European Search Report dated Aug. 2, 2021 for EP Application No. 19869819.3.

* cited by examiner

ELECTRONIC DEVICE INCLUDING SENSOR MOUNTED BELOW DISPLAY PANEL

CROSS-REFERENCE TO RELATED APPLICATION

This application is based on and claims priority under 35 U.S.C. § 119 to Korean Patent Application No. 10-2018-0119349, filed on Oct. 5, 2018, in the Korean Intellectual Property Office, the disclosure of which is incorporated by reference herein in its entirety.

BACKGROUND

1) Field

The disclosure relates to an electronic device including a sensor mounted below a display panel.

2) Description of Related Art

In a mobile electronic device, in order to widen a display area while maintaining or reducing the volume of the mobile electronic device in order to improve the portability of the mobile electronic device, it is possible to use the majority of the front face of the mobile electronic device as a display by extending the display of the mobile electronic device.

In the case of extending the display of the electronic device, more information may be provided in a limited size, and in the case of applying a full display to the front face, an aesthetically pleasing feeling may be provided to a user.

On the front face of the electronic device, the display area may be extended, for example, by processing corners of the front face as edges and reducing the size of a bezel, and a sensor may be disposed below the front display panel to be placed in the display area.

In order to extend the display area to most of the front face of the electronic device, optical sensors may be disposed in the display area. When an optical sensor is disposed below the display panel, an air layer and a substrate layer of the display panel may be added above the optical sensor. When the transmittance of a sensors is lowered, the power consumption of the sensor may be increased in order to increase the intensity of emitted light.

When an optical sensor is mounted below a display panel, various methods may be required to reduce a decrease in transmittance due to reflection occurring at an interlayer interface forming the display panel.

The above information is presented as background information only to assist with an understanding of the disclosure. No determination has been made, and no assertion is made, as to whether any of the above might be applicable as prior art with regard to the disclosure.

SUMMARY

Embodiments of the disclosure may provide an electronic device according which may include an optical sensor and a display panel. The display panel may include a first substrate, a second substrate, a pixel layer disposed between the first substrate and the second substrate, the pixel layer including at least one opening in at least a portion thereof, and a light-transmissive member comprising a light-transmitting material disposed in at least a portion of the opening and having a second reflective index corresponding to a first reflective index of the second substrate. The optical sensor may be disposed below the second substrate at least partially overlapping a predetermined area of the display panel corresponding to the opening.

According to various example embodiments of the disclosure, an electronic device may include a display panel, an optically clear adhesive (OCA) layer disposed on one face of the display panel, a polarization layer disposed on the optically adhesive layer, a transparent plate disposed on the optically clear adhesive layer, and an optical sensor disposed to be spaced apart from an other face of the display panel. The display panel may include a first substrate, a second substrate facing the first substrate, a pixel layer disposed between the first substrate and the second substrate, the pixel layer including at least one opening formed in at least a portion overlapping the optical sensor, and an anti-reflection (AR) layer disposed in an area corresponding to the opening. The optical sensor may be disposed below the second substrate to at least partially overlap a predetermined area of the display panel corresponding to the opening.

The electronic device according to various embodiments is capable of increasing transmittance by reducing reflection occurring at the interfaces of respective layers of the display panel disposed above an optical sensor.

The electronic device according to various example embodiments is capable of increasing the light transmittance of the sensor mounted on the front face thereof, thereby reducing the power consumption of the sensor mounted on the front face.

BRIEF DESCRIPTION OF THE DRAWINGS

The above and other aspects, features, and advantages of certain embodiments of the disclosure will be more apparent from the following detailed description, taken in conjunction with the accompanying drawings, in which.

DETAILED DESCRIPTION

Figure 1:
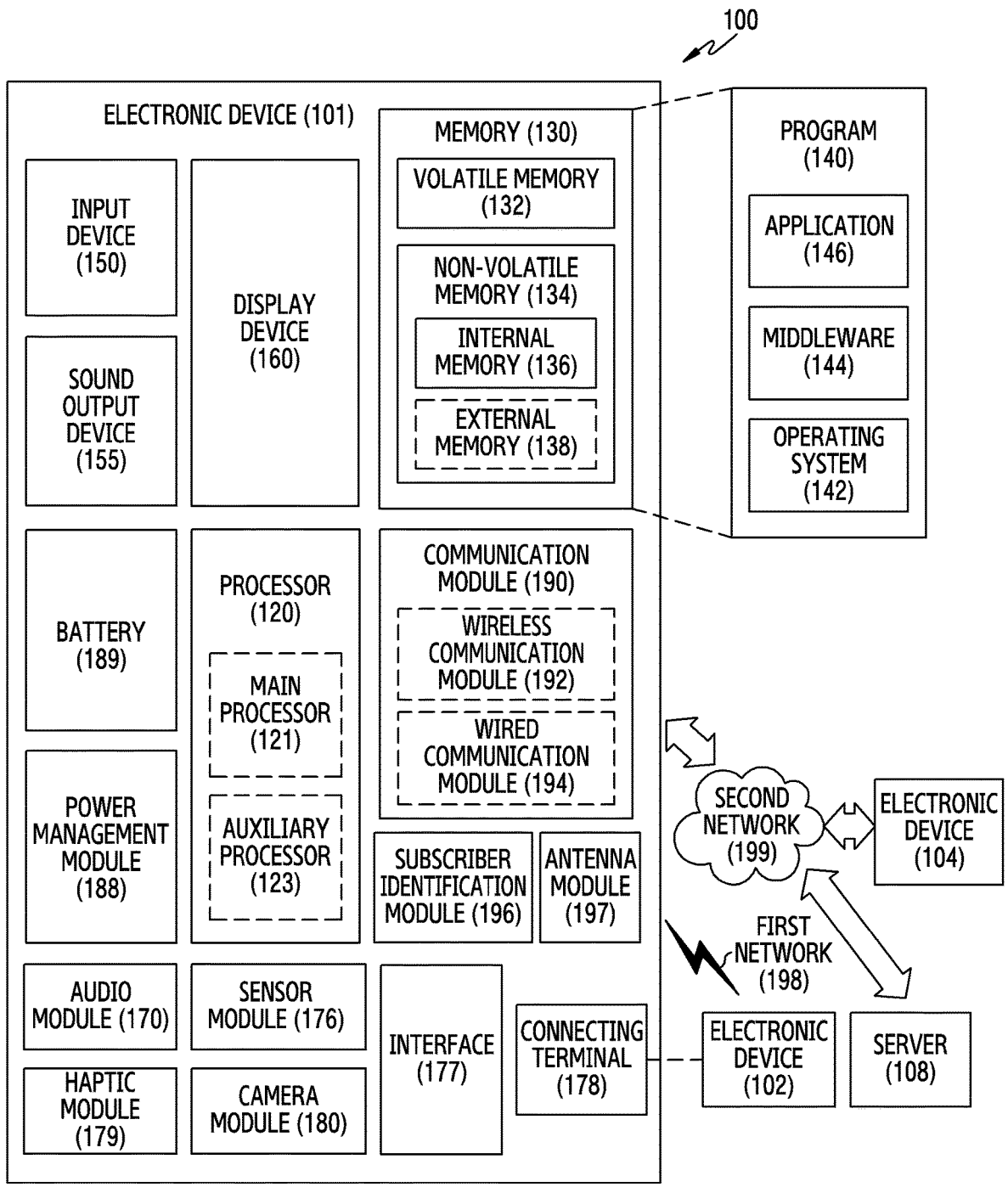
FIG. 1 is a block diagram illustrating an example electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an example embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an example embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive signals or power to or from the outside (e.g., an external electronic device). According to an embodiment, an antenna module may be formed of a conductor or a conductive pattern. According to some embodiments, the antenna module may further include other components (e.g., an RFIC) in addition to the conductor or the conductive pattern. According to an embodiment, the antenna module 197 may include one or more antennas, from which at least one antenna suitable for a communication scheme used in a communication network, such as the first network 198 or the second network 199, may be selected by, for example, the communication module 190. The signals or power may be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
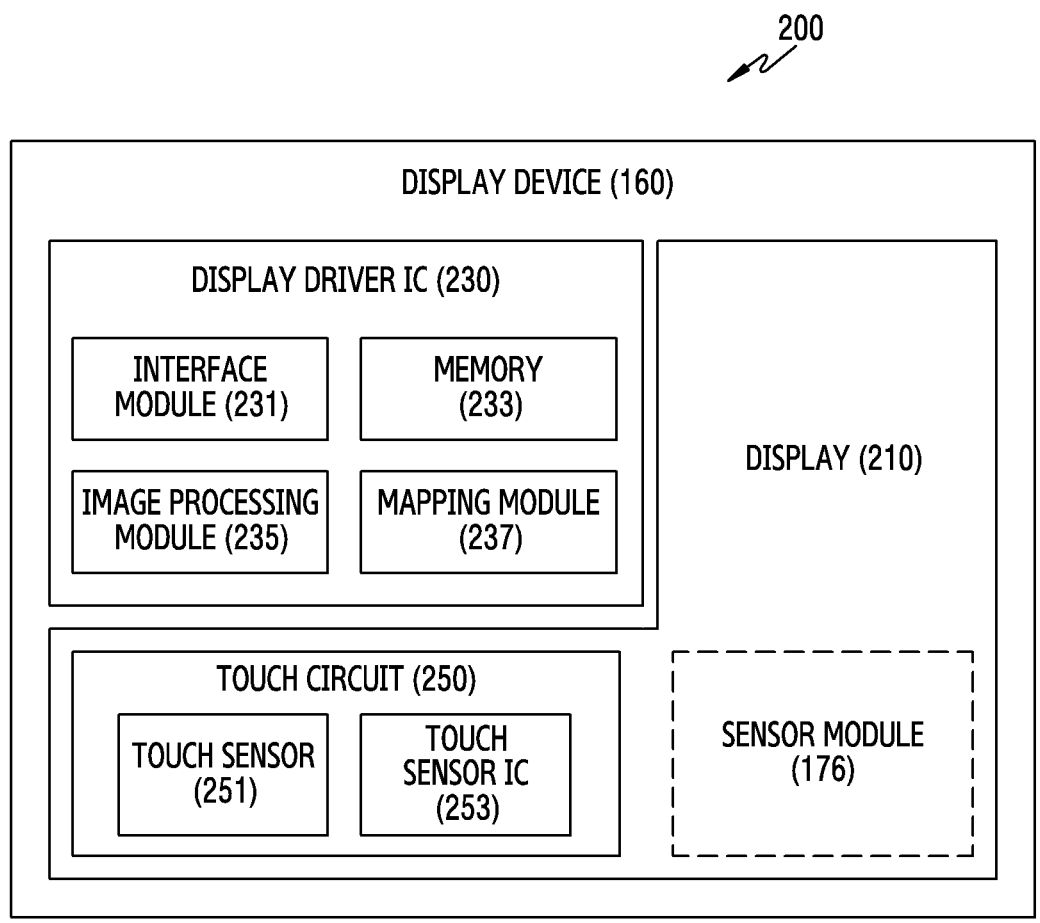
FIG. 2 is a block diagram illustrating an example display device according to various embodiments.

FIG. 2 is a block diagram 200 illustrating the display device 160 according to various embodiments. Referring to FIG. 2, the display device 160 may include a display 210 and a display driver integrated circuit (DDI) 230 to control the display 210. The DDI 230 may include an interface module (e.g., including interface circuitry) 231, memory 233 (e.g., buffer memory), an image processing module (e.g., including image processing circuitry) 235, a mapping module (e.g., including mapping circuitry) 237, or the like. The DDI 230 may receive image information that contains image data or an image control signal corresponding to a command to control the image data from another component of the electronic device 101 via the interface module 231. For example, according to an embodiment, the image information may be received from the processor 120 (e.g., the main processor 121 (e.g., an application processor)) or the auxiliary processor 123 (e.g., a graphics processing unit) operated independently from the function of the main processor 121. The DDI 230 may communicate, for example, with touch circuitry 150 or the sensor module 176 via the interface module 231. The DDI 230 may also store at least part of the received image information in the memory 233, for example, on a frame by frame basis.

The image processing module 235 may perform preprocessing or post-processing (e.g., adjustment of resolution, brightness, or size) with respect to at least part of the image data. According to an embodiment, the pre-processing or post-processing may be performed, for example, based at least in part on one or more characteristics of the image data or one or more characteristics of the display 210.

The mapping module 237 may generate a voltage value or a current value corresponding to the image data pre-processed or post-processed by the image processing module 235. According to an embodiment, the generating of the voltage value or current value may be performed, for example, based at least in part on one or more attributes of the pixels (e.g., an array, such as an RGB stripe or a pentile structure, of the pixels, or the size of each subpixel). At least some pixels of the display 210 may be driven, for example, based at least in part on the voltage value or the current value such that visual information (e.g., a text, an image, or an icon) corresponding to the image data may be displayed via the display 210.

According to an embodiment, the display device 160 may further include the touch circuitry 250. The touch circuitry 250 may include a touch sensor 251 and a touch sensor IC 253 to control the touch sensor 251. The touch sensor IC 253 may control the touch sensor 251 to sense a touch input or a hovering input with respect to a certain position on the display 210. To achieve this, for example, the touch sensor 251 may detect (e.g., measure) a change in a signal (e.g., a voltage, a quantity of light, a resistance, or a quantity of one or more electric charges) corresponding to the certain position on the display 210. The touch circuitry 250 may provide input information (e.g., a position, an area, a pressure, or a time) indicative of the touch input or the hovering input detected via the touch sensor 251 to the processor 120. According to an embodiment, at least part (e.g., the touch sensor IC 253) of the touch circuitry 250 may be formed as part of the display 210 or the DDI 230, or as part of another component (e.g., the auxiliary processor 123) disposed outside the display device 160.

According to an embodiment, the display device 160 may further include at least one sensor (e.g., a fingerprint sensor, an iris sensor, a pressure sensor, or an illuminance sensor) of the sensor module 176 or a control circuit for the at least one sensor. In such a case, the at least one sensor or the control circuit for the at least one sensor may be embedded in one portion of a component (e.g., the display 210, the DDI 230, or the touch circuitry 150)) of the display device 160. For example, when the sensor module 176 embedded in the display device 160 includes a biometric sensor (e.g., a fingerprint sensor), the biometric sensor may obtain biometric information (e.g., a fingerprint image) corresponding to a touch input received via a portion of the display 210. As another example, when the sensor module 176 embedded in the display device 160 includes a pressure sensor, the pressure sensor may obtain pressure information corresponding to a touch input received via a partial or whole area of the display 210. According to an embodiment, the touch sensor 251 or the sensor module 176 may be disposed between pixels in a pixel layer of the display 210, or over or under the pixel layer.

The electronic device according to various embodiments may be one of various types of electronic devices. The electronic devices may include, for example, and without limitation, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 3A:
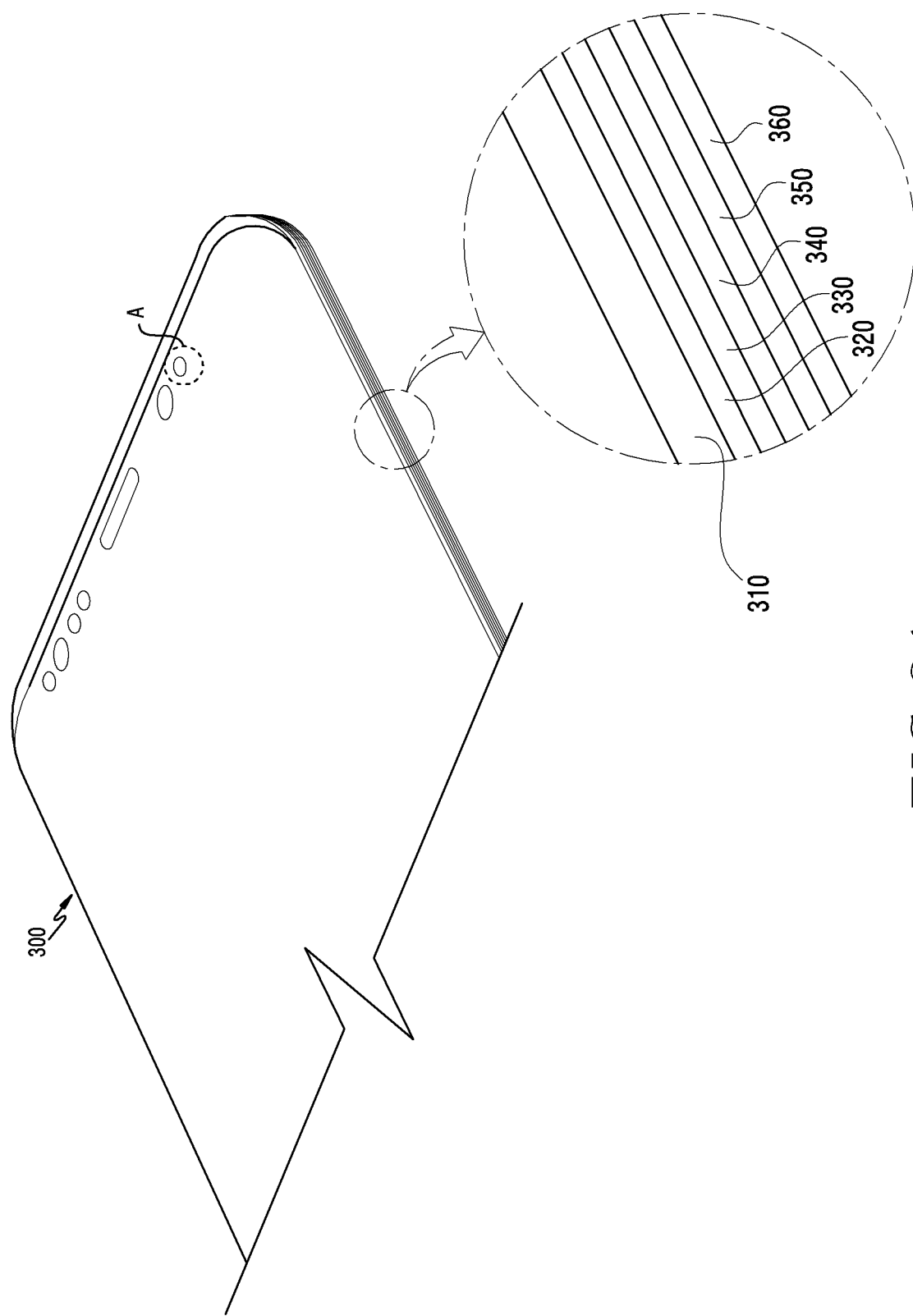
FIG. 3A is a perspective view illustrating an example display panel according to various embodiments.
Figure 3B:
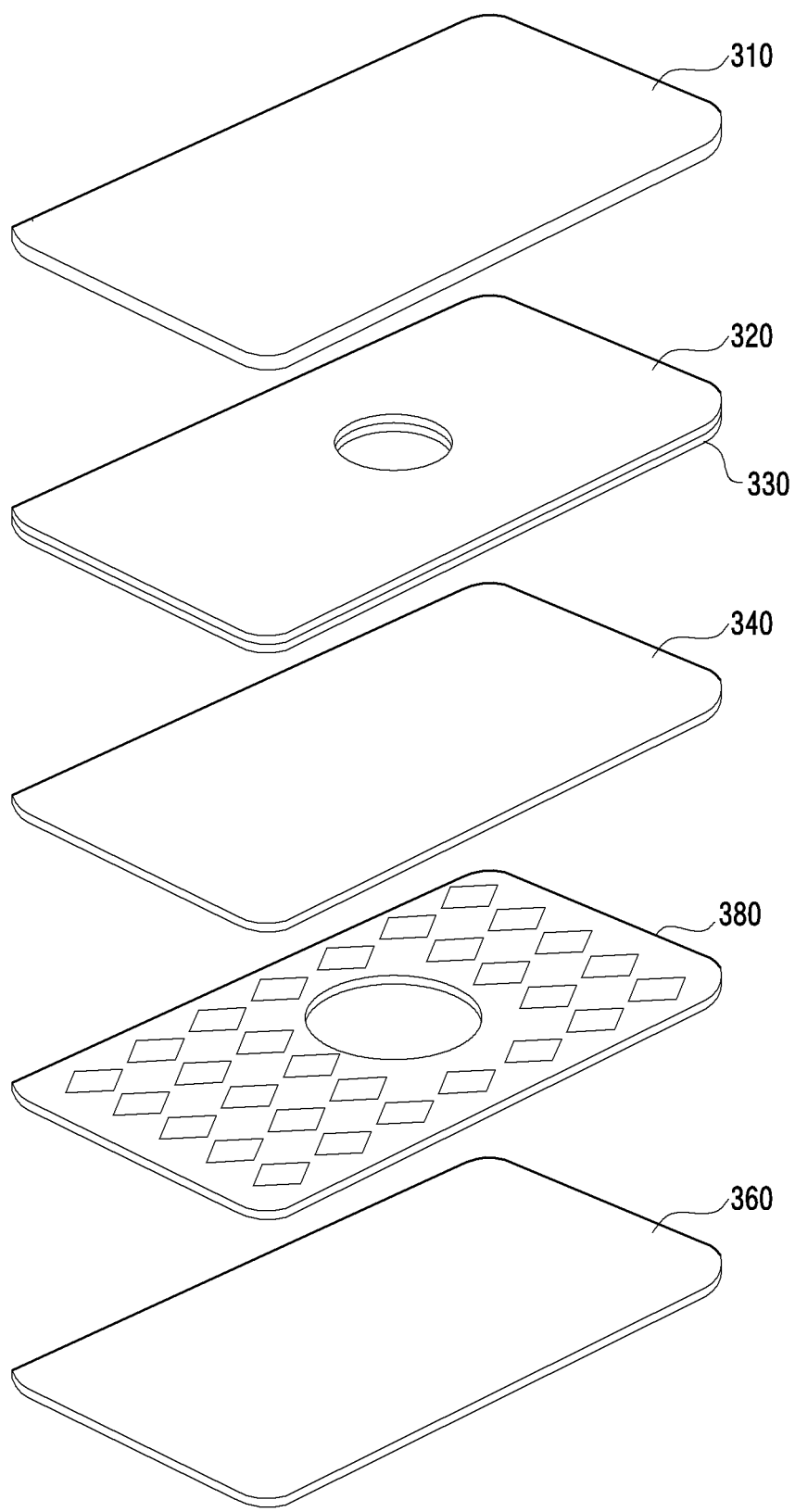
FIG. 3B is an exploded perspective view illustrating area A in FIG. 3A according to various embodiments.

FIG. 3A is a perspective view illustrating an example display according to various embodiments, and FIG. 3B is an exploded perspective view illustrating an area A in FIG. 3A according to various embodiments.

Referring to FIGS. 3A and 3B, a display 300 may include a front plate 310, a polarization layer 330, a first substrate 340, a second substrate 360, and a pixel layer 380.

According to various embodiments, the front plate 310 may be formed of a transparent member comprising a transparent material to transmit light emitted from a display panel to the outside so as to be transmitted to the user. The front plate 310 may be included in an electronic device (e.g., the electronic device 101 of FIG. 1). The front plate 310 may include, for example, and without limitation, at least one material of glass or a polymer material such as polycarbonate (PC), polymethyl methacrylate (PMMA), polyimide (PE), polyethylene terephthalate (PET), or polypropylene terephthalate (PPT).

According to various embodiments, the polarization layer 330 may be stacked below the front plate 310. The polarization layer 330 may have various directivities, and light emitted therefrom may have a constant directivity. The polarization layer 330 may prevent and/or reduce the light incident from the outside from being transmitted to the user's eyes by being reflected by an electrode included in the pixel layer 380 or the like. The polarization layer 330 may include a phase delay film. External light transmitted through the polarization layer 330 is phase-changed through the phase delay film, and the polarization layer 330 may block transmission of phase-changed and reflected light.

According to various embodiments, an optically clear adhesive layer 320 may be stacked between the front plate 310 and the polarization layer 330, and the optical transparent adhesive layer 320 may bond the front plate 310 and the polarization layer 330 to each other.

According to various embodiments, the optically clear adhesive layer 320 and the polarization layer 330 may each include an opening in an area corresponding to the optical sensor. A plurality of optical sensors may be provided, and the optically clear adhesive layer 320 and the polarization layer 330 may each include openings, the number of which corresponds to the number of optical sensors, in areas corresponding to the optical sensors. In order to prevent and/or reduce the polarization of light received by the optical sensor through the polarization layer 330, the polarization layer 330 may include an opening, and the optically clear adhesive layer 320 may also include an opening in the corresponding area.

According to various embodiments, a display panel may be disposed below the polarization layer 330. The display panel may include a first substrate 340, a second substrate 360, and a pixel layer 380. The first substrate 340 may be an encapsulation layer, and a pixel layer 380 may be disposed on the second substrate 360. Light emitted from the pixel layer 380 may be transmitted to the outside through the front plate 310. Light emitted from the pixel layer 380 may form information, and the information may be visually recognized by the user.

According to various embodiments, the electrodes of the pixel layer 380 may be made of a metal, and the performance of the optical sensor positioned below the display panel may be degraded by the light reflected by the metal. According to various embodiments, the pixel layer 380 may include an opening in an area corresponding to the optical sensor therebelow.

According to various embodiments, the first substrate 340 may be made of a material (e.g., glass) to prevent and/or reduce the inflow of oxygen and moisture, and a sealing member 350 may include a sealing material and be disposed to seal a gap between the first substrate 340 and the second substrate 360 so as to seal the inner space. The sealing member 350 may be disposed on face of the second substrate 360 so as to prevent and/or reduce the inflow of moisture or oxygen into the pixel layer 380 disposed in the inner space.

Figure 4A:
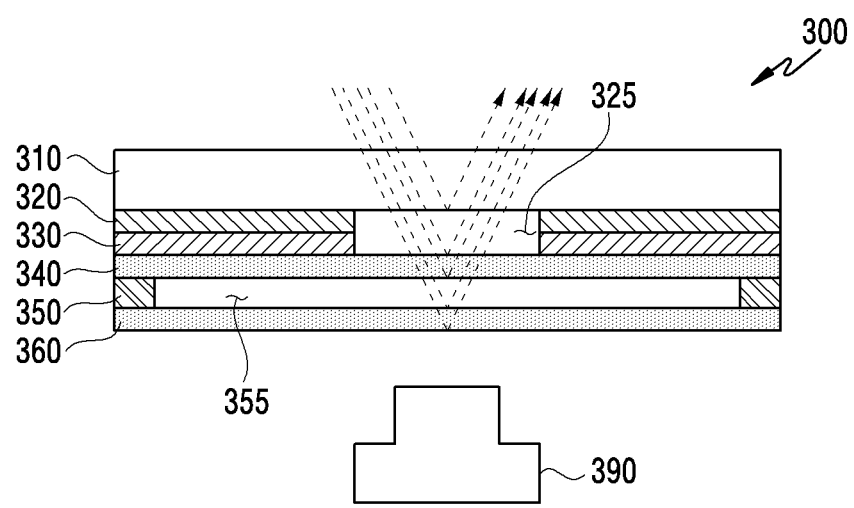
FIG. 4A is a sectional view illustrating example reflection of the light incident on an optical sensor according to various embodiments.
Figure 4B:
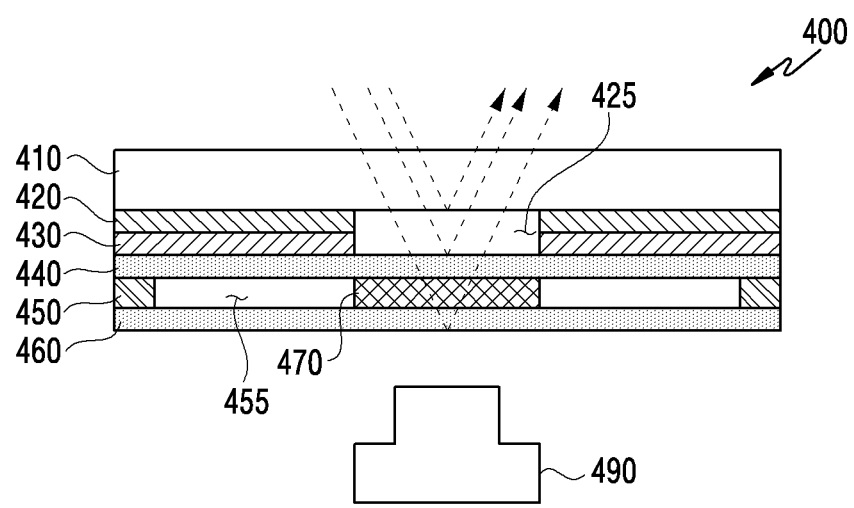
FIG. 4B is a sectional view illustrating example reflection of the light incident on an optical sensor according to various embodiments.
Figure 4C:
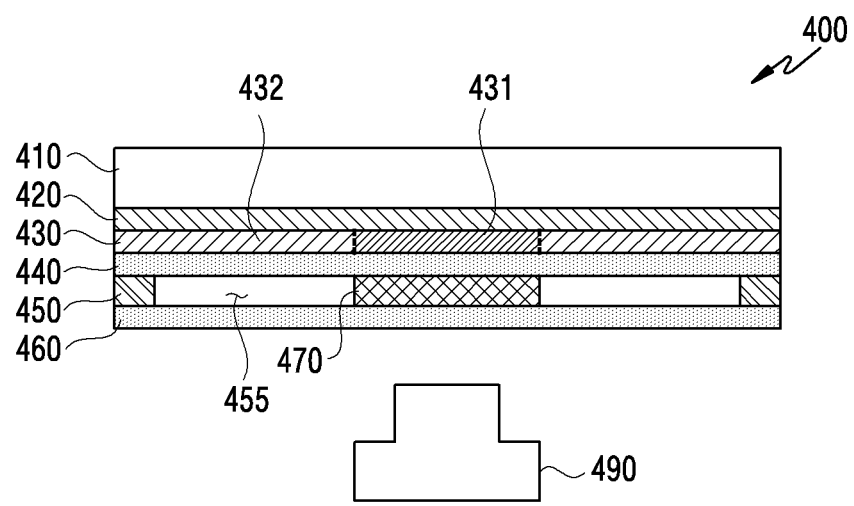
FIG. 4C is a sectional view illustrating an example stack structure of a display panel according to various embodiments.

FIG. 4A is a sectional view illustrating example reflection of the light incident on an optical sensor according to various embodiments, FIG. 4B is a sectional view illustrating example reflection of the light incident on an optical sensor according to various embodiments, and FIG. 4C is a sectional view illustrating an example stack structure of a display panel according to various embodiments.

Referring to FIG. 4A, a display 300 may include a front plate 310, an optically clear adhesive layer 320, a polarization layer 330, a first substrate 340, and a second substrate 360.

According to various embodiments, the first substrate 340 and the second substrate 360 may be disposed below the polarization layer 330, the polarization layer 330, the optically clear adhesive layer 320, and the front plate 310 may be sequentially stacked on the top of the first substrate 340, and an optical sensor 390 may be disposed below the display 300. A sealing member 350 may be disposed between the first substrate 340 and the second substrate 360.

The optical sensor 390 may be a sensor using light, such as, for example, and without limitation, an illuminance sensor, an IR sensor, a camera, a fingerprint sensor, or the like. When the proportion of the reflected light in the light received by the optical sensor 390 increases, the amount of light reaching the optical sensor 390 may decrease. The light incident from the outside may be reflected not only from the surface of the front plate 310, but also from the interfaces of respective layers of the display panel. Assuming that the reflectance of light due to reflection occurring in each layer is approximately 4%, six reflections occur and the light reaching the optical sensor 390 is only about 76% of the originally incident light. Thus, the sensitivity of the optical sensor 390 may be lowered, or power consumption may be increased in order to improve the sensitivity of the optical sensor 390.

According to various embodiments, in the area in which the optical sensor 390 is disposed, the pixel layer may be removed between the second substrate 360 and the first substrate 340. In order to prevent and/or reduce the transmittance of light from being lowered by the reflection from the metal electrodes existing in the pixel layer, leaving mostly the air layer 355.

According to various embodiments, the polarization layer 330 and the optically clear adhesive layer 320 may also include an air layer 325. In order to prevent and/or reduce the amount of light reaching the optical sensor from decreasing and to prevent and/or reduce the characteristics of the light from changing due to the polarization of incident light by the polarization layer 330, the polarization layer may be removed.

Referring to FIG. 4B, a display 400 may include a front plate 410, an optically clear adhesive layer 420, a polarization layer 430, a first substrate 440, and a second substrate 460.

According to various embodiments, the first substrate 440 and the second substrate 460 may be disposed below the polarization layer 430, and the polarization layer 430, the optically clear adhesive layer 420, and the front plate 410 may be sequentially stacked on the top of the first substrate 440, and an optical sensor 490 may be disposed below the display 400. A sealing member 450 may be disposed between the first substrate 440 and the second substrate 460.

According to various embodiments, a light-transmissive member 470 may have a refractive index corresponding to the refractive indices of the first substrate 440 and the second substrate 460. If the refractive index of the light-transmissive member 470 is the same as those of the first substrate 440 and the second substrate 460, the light incident from the outside is reflected from the interface between the first substrate 440 and a second air layer 425 between the first substrate 440 and the front plate, and the light reaching the first substrate 440 may be transmitted to the second substrate 460 through the first substrate 440 and the light-transmissive member 470 without reflection or refraction.

According to various embodiments, if a first air layer 455 is disposed between the first substrate 440 and the second substrate 460 to overlap an area corresponding to the optical sensor, additional reflection may occur in the first substrate 440 and the first air layer 455, and additional reflection may occur between the first air layer 455 and the second substrate 460.

According to various embodiments, if a light-transmissive member 470 having the same refractive index as the first substrate 440 and the second substrate 460 is disposed between the first substrate 440 and the second substrate 460, the transmittance of light reaching the optical sensor 490 may increase.

According to various embodiments, the width of the light-transmissive member 470 may be the same as or larger than the width of an area corresponding to the optical sensor 490.

Referring to FIG. 4C, a polarization layer 430 and an optically clear adhesive layer 420 are formed at the position where the first air layer 425 is disposed in FIG. 4B. The polarization layer 430 may have a non-polarization characteristic in an area 431 corresponding to the optical sensor 490. In the polarization layer 430, an area 431 corresponding to the optical sensor 490 and an area 432 not corresponding to the optical sensor 490 may be formed of the same material, and may differ from each other in terms of the presence/absence of the polarization characteristic. The refractive index of the polarization layer 430 may be similar to the refractive index of the front plate 410.

According to various embodiments, reflection hardly occurs at the interface between the area 431 having the non-polarization characteristic and the front plate 410, and the transmitted light is reflected from both faces of the optically clear adhesive layer 430, and passes through the first substrate 440, the light-transmissive member 470, and the second substrate 460 to reach the optical sensor 490. Therefore, the transmittance of the light transmitted from the outside and reaching the optical sensor 490 can be improved.

Figure 5:
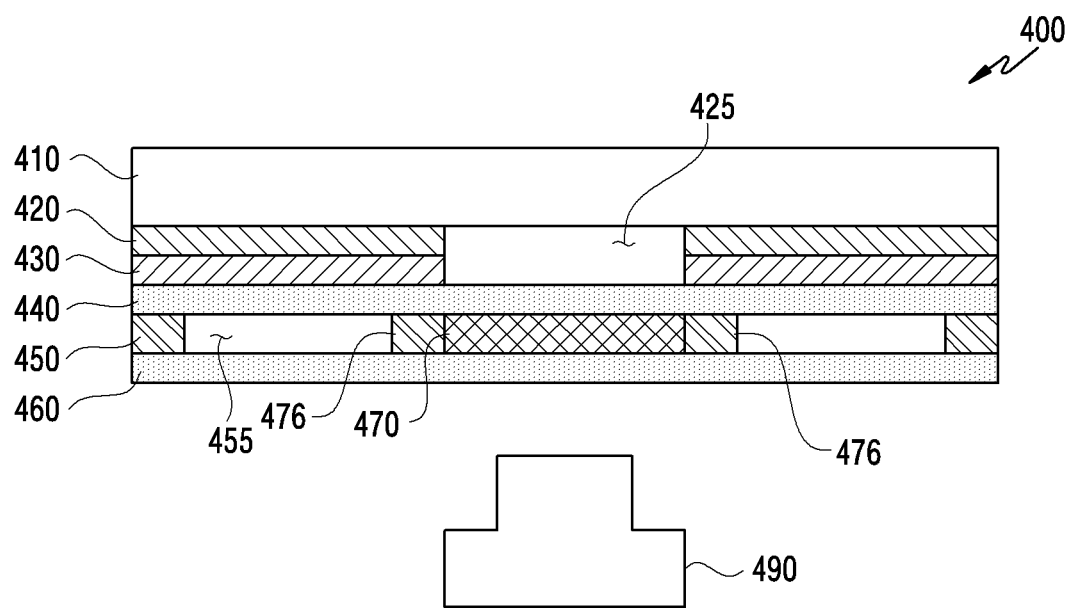
FIG. 5 is a sectional view illustrating an example partition added to prevent and/or reduce a light transmission member from flowing in a display panel according to various embodiments.

FIG. 5 is a sectional view illustrating a partition added to prevent and/or reduce a light transmission member from moving in a display panel according to various embodiments.

Referring to FIG. 5, the display 400 may be similar or identical to the display of FIG. 4. The display 400 may include a front plate 410, an optically clear adhesive layer 420, a polarization layer 430, a first substrate 440, and a second substrate 460.

According to various embodiments, the first substrate 440 and the second substrate 460 may be disposed below the polarization layer 430, and the polarization layer 430, the optically clear adhesive layer 420, and the front plate 410 may be sequentially stacked on the top of the first substrate 440, and an optical sensor 490 may be disposed below the display 400. A sealing member 450 may be disposed between the first substrate 440 and the second substrate 460.

According to various embodiments, the light-transmissive member 470 may have fluidity. The light-transmissive member 470 may be a viscous transparent material, and the light-transmissive member 470 may have a refractive index corresponding to those of the first substrate 440 and the second substrate 460.

According to various embodiments, when made of a flowable material, the light-transmissive member 470 may spread laterally. In order to prevent and/or reduce the light-transmissive member 470 from flowing, a partition 476 may be disposed on the sides of the light-transmissive member 470. The partition 476 may be disposed between the first substrate 440 and the second substrate 460, and may have a shape surrounding the light-transmissive member 470.

According to various embodiments, the light-transmissive member 470 is disposed to completely fill the space between the first substrate 440 and the second substrate 460 such that the light incident from the outside does not pass through the air layer 455.

Figure 6A:
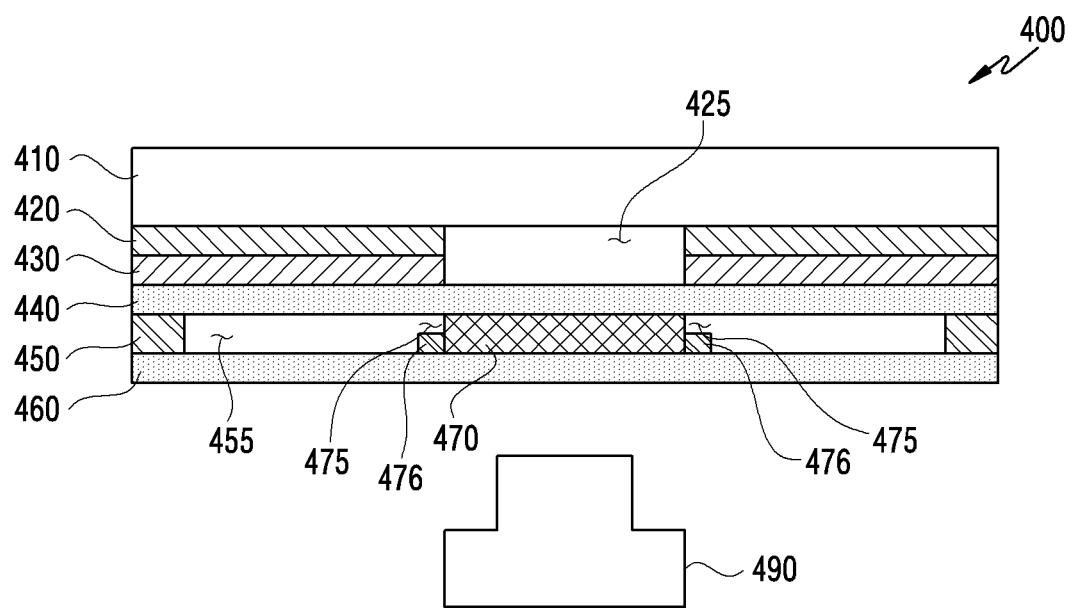
FIG. 6A is a sectional view illustrating an example in which the partitions of FIG. 5 are modified according to various embodiments.
Figure 6B:
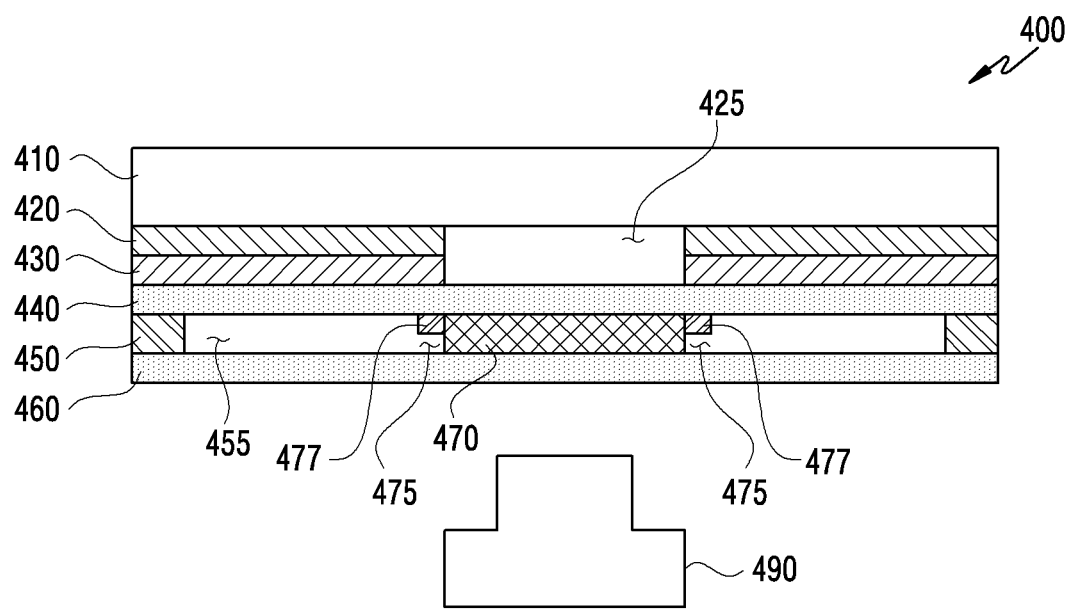
FIG. 6B is a sectional view illustrating an example in which the partition of FIG. 5 are modified according to various embodiments.
Figure 6C:
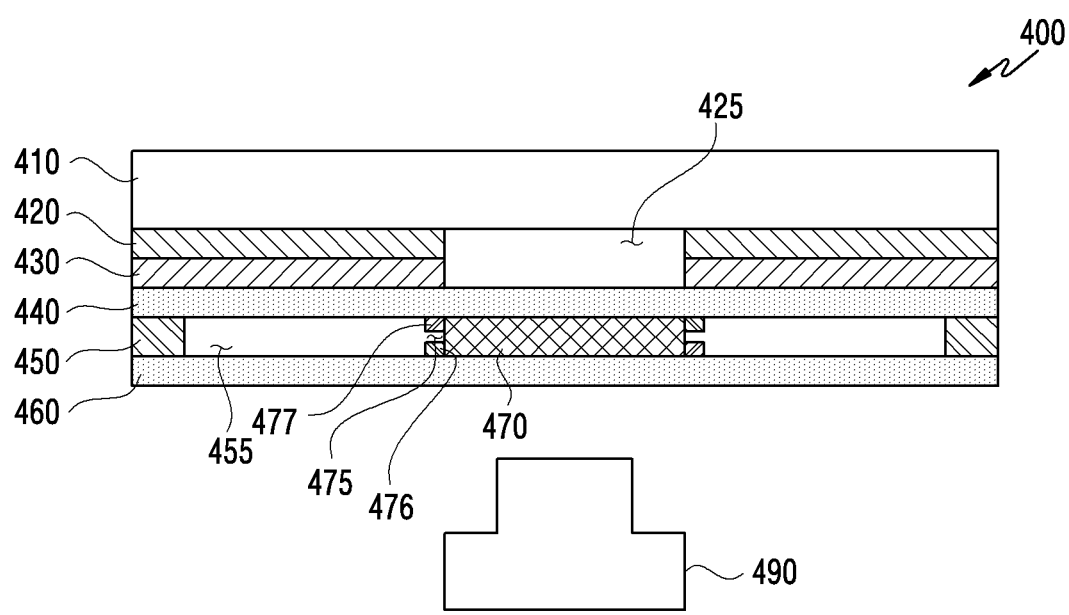
FIG. 6C is a sectional view illustrating an example in which the partitions of FIG. 5 are modified according to various embodiments.

FIG. 6A is a sectional view illustrating an example in which the partitions of FIG. 5 are modified according to various embodiments, FIG. 6B is a sectional view illustrating an example in which the partitions of FIG. 5 are modified according to various embodiments are modified, and FIG. 6C is a sectional view illustrating an example in which the partitions of FIG. 5 are modified according to various embodiments.

Referring to FIGS. 6A, 6B, and 6C, the display 400 may be similar or identical to the displays of FIGS. 4 and 5.

According to various embodiments, the first substrate 440 and the second substrate 460 may be disposed below the polarization layer 430, and the polarization layer 430, the optically clear adhesive layer 420, and the front plate 410 may be sequentially stacked on the top of the first substrate 440, and an optical sensor 490 may be disposed below the display 400. A sealing member 450 may be disposed between the first substrate 440 and the second substrate 460.

According to various embodiments, partitions 476 and 477 may be disposed to prevent and/or reduce the light-transmissive member 470 from flowing laterally and to maintain the shape of the light-transmissive member 470. According to various embodiments, when the material of the light-transmissive member 470 is insufficient, air may be included in the light-transmissive member 470 or an air layer may be formed in an area overlapping the optical sensor 490. In consideration of the tolerance of the opening forming the second air layer 425 or shrinkage of the light-transmissive member 470 due to curing, the light-transmissive member 470 may be formed using more of the material than the actual required amount.

According to various embodiments, the partitions 476 and 477 may form a passage 475 that allows the material of the light-transmissive member 470 to flow such that the material of the light-transmissive member 470 may fill and remain in the area overlapping the optical sensor 490.

According to various embodiments, the partitions 476 and 477 may be formed in various shapes to form the passage 475. Referring to FIG. 6A, the light-transmissive member 470 may be formed between the first substrate 440 and the second substrate 460. The lower partition 476 may be disposed to surround a portion of the side faces of the light-transmissive member 470. The lower partition 476 may be disposed on the second substrate 440, and may be spaced apart from the first substrate 440. A passage 475 through which the light-transmissive member 470 may flow may be formed between the lower partition 476 and the first substrate 440.

Referring to FIG. 6B, the light-transmissive member 470 may be formed between the first substrate 440 and the second substrate 460. The upper partition 477 may be disposed to surround a part of the side faces of the light transmitting member 470. A polarization layer 430 may be disposed on one face of the first substrate 440. The upper partition 477 may be disposed on the other face of the first substrate 440. The upper partition 477 may be spaced apart from the second substrate 460. A passage 475 through which the light-transmissive member 470 may flow may be formed between the upper partition 477 and the second substrate 460.

Referring to FIG. 6C, the light-transmissive member 470 may be formed between the first substrate 440 and the second substrate 460. The upper partition 477 and the lower partition 476 may be disposed to surround a part of the side faces of the light transmitting member 470. The upper partition 477 may formed on the face of the first substrate 440 facing the second air layer 455, and the lower partition 476 may be formed on the face of the second substrate 460 facing the second air layer 455. The upper partition 477 may be disposed to face and to be spaced apart from the lower partition 476. The passage 475 may be formed between the upper partition 477 and the lower partition 476. The passage 475 may be connected to the second air layer 455 so that a part of the light-transmissive member 470 may flow through the passage 475.

Figure 7:
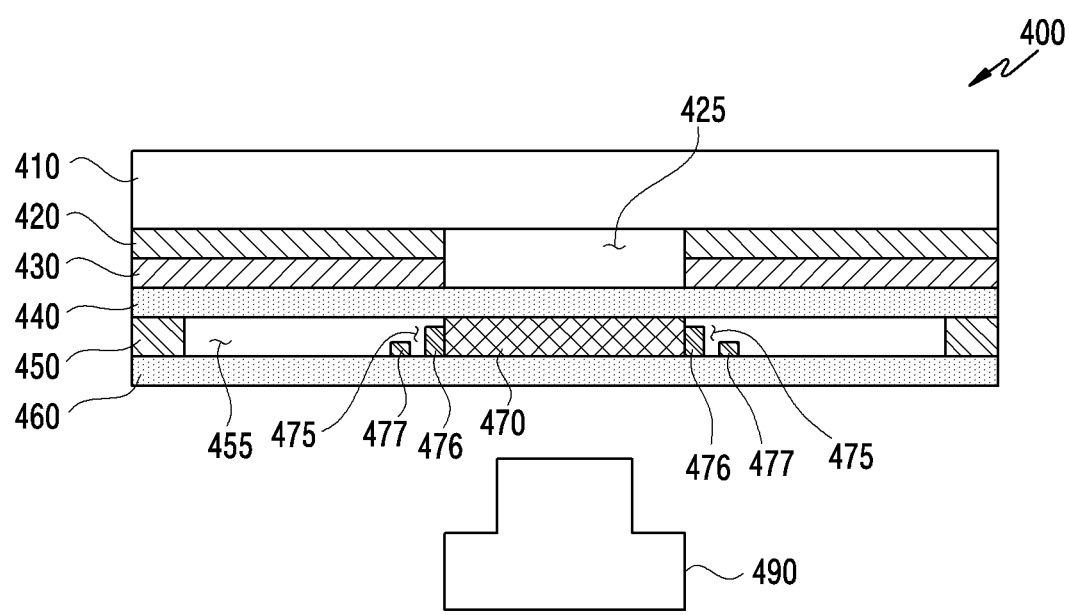
FIG. 7 is a sectional view illustrating an example in which an additional wall is disposed in the partition of FIG. 5 according to various embodiments.

FIG. 7 is a sectional view illustrating an example in which an additional wall is disposed in the partition of FIG. 5 according to various embodiments.

The display of FIG. 7 may be similar to the displays of FIGS. 5 and 6.

Referring to FIG. 7, the display 400 may be similar or identical to the display of FIG. 4. The display 400 may include a front plate 410, an optically clear adhesive layer 420, a polarization layer 430, a first substrate 440, and a second substrate 460.

According to various embodiments, the first substrate 440 and the second substrate 460 may be disposed below the polarization layer, the polarization layer 430, the optically clear adhesive layer 420, and the front plate 410 may be sequentially stacked on the top of the first substrate 440, and an optical sensor 490 may be disposed below the display 400. A sealing member 450 may be disposed between the first substrate 440 and the second substrate 460.

According to various embodiments, the light-transmissive member 470 may be positioned in an area overlapping the optical sensor 490, and the light-transmissive member 470 may be disposed between the first substrate 440 and the second substrate 460. Since the light-transmissive member 470 may flow with viscosity, the partitions 476 and 477 may be formed. Multiple partitions 476 and 477 may be formed, and the first partition 476 may be formed to surround the light-transmissive member 470. The second partition 477 may be formed to be spaced apart from and to surround the first partition 476. According to various embodiments, the second partition 477 may be disposed adjacent to the first partition 476. The space between the first partition 476 and the second partition 477 may be formed to such an extent that the light-transmissive member 470 may be stored in the space in an amount overflowing the first partition 476.

According to various embodiments, the first partition 476 and the second partition 477 may be disposed on the second substrate 460, and may be spaced apart from the first substrate 440. The heights of the first and second partitions 476 and 477 may be different from each other. The second partition 477 may be higher than the first partition 476, or vice versa.

According to various embodiments, the heights of the first and second partitions 476 and 477 may be the same. The first partition 476 may maintain the overall shape of the light-transmissive member 470. If the material of the light-transmissive member 470 flows and overflows before the light-transmissive member 470 is cured, the second partition 477 may prevent and/or reduce the material from further flowing to the second air layer 455.

According to various embodiments, the first partition 476 may be spaced apart from the first substrate 440 or the second substrate 460 to form a path 475 through which the light-transmissive member 470 may flow, or the first partition 476 may be formed on the first substrate 440 and the second substrate 460 to form a path 475 through which the light-transmissive member 470 may flow.

According to various embodiments, the second partition 477 may be formed between the first substrate 440 and the second substrate 460 to close the periphery of the first partition 476. The light-transmissive member 470 flowing through the passage 475 formed in the first partition 476 may be prevented and/or reduced from flowing to the air layer 455 by the second partition 477.

Figure 8A:
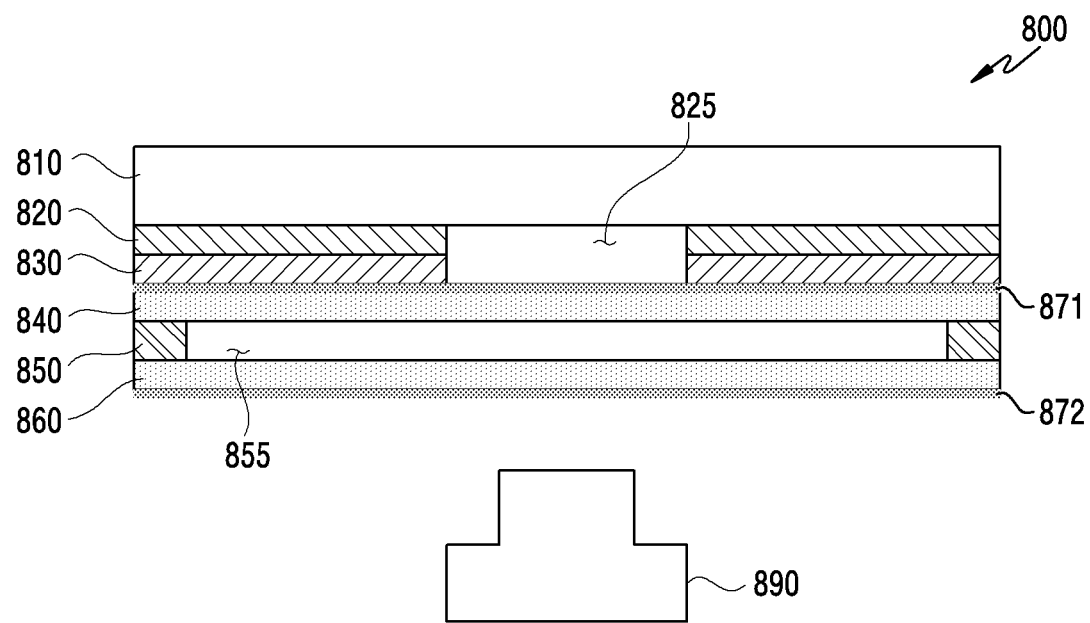
FIG. 8A is a sectional view illustrating an example in which an AR coating layer is added to a display panel according to various embodiments.
Figure 8B:
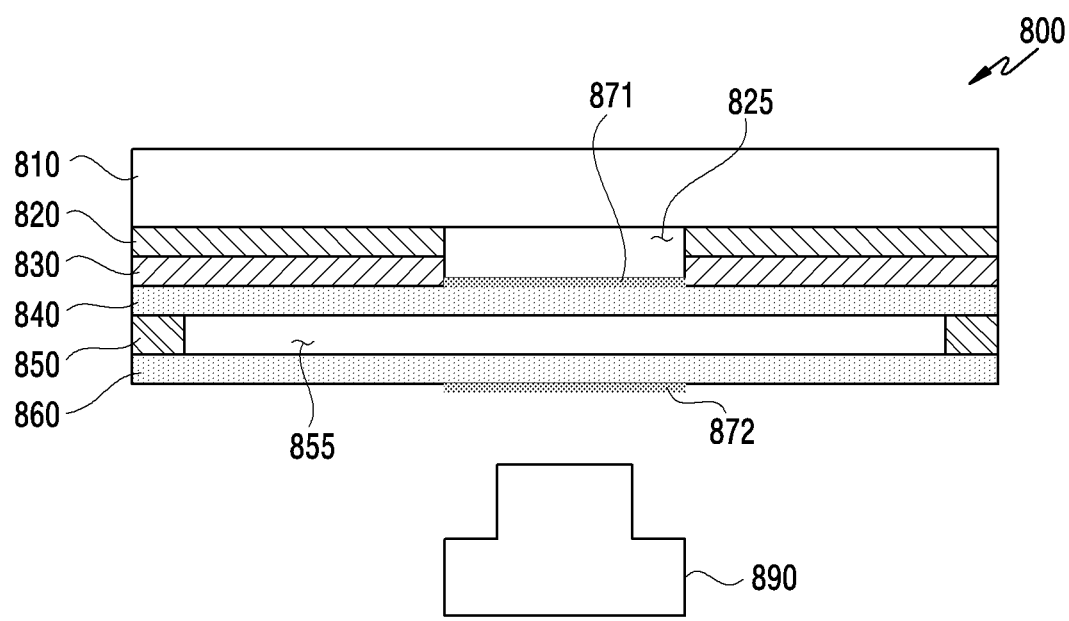
FIG. 8B is a sectional view illustrating an example in which an AR coating layer is added to a display panel according to various embodiments.
Figure 8C:
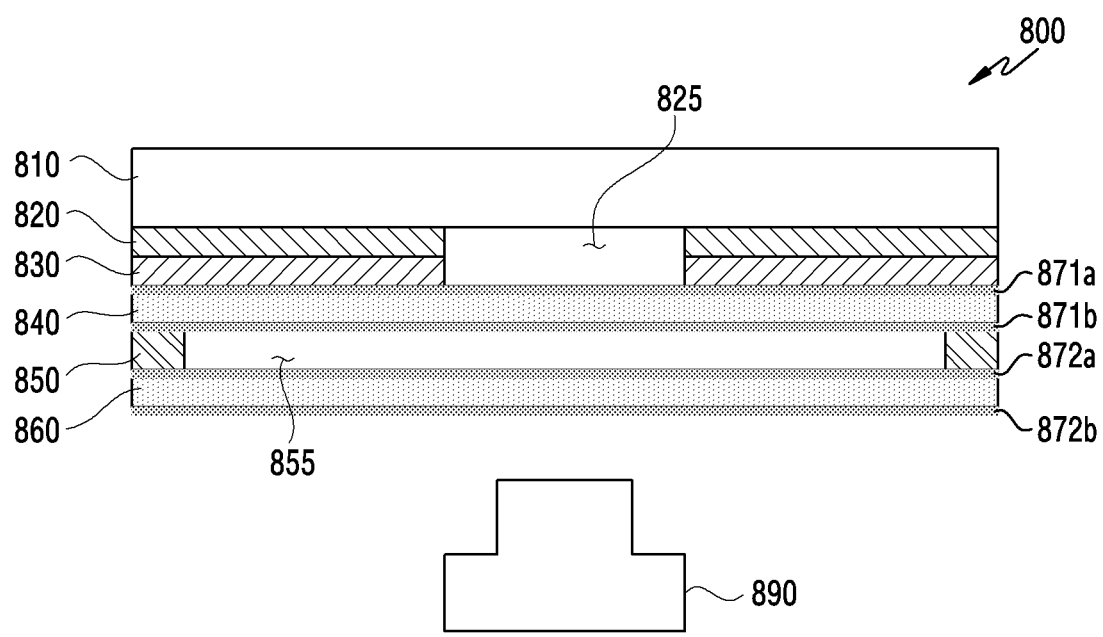
FIG. 8C is a sectional view illustrating an example in which an AR coating layer is added to a display panel according to various embodiments.

FIG. 8A is a sectional view illustrating an example in which an AR coating layer is added to a display panel according to various embodiments, FIG. 8B is a sectional view illustrating an example in which an AR coating layer is added to a display panel according to various embodiments, and FIG. 8C is a sectional view illustrating an example in which an AR coating layer is added to a display panel according to various embodiments.

Referring to FIGS. 8A, 8B, and 8C, a display 800 may include a front plate 810, an optically clear adhesive layer 820, a polarization layer 830, a first substrate 840, and a second substrate 860.

According to various embodiments, the first substrate 840 and the second substrate 860 may be disposed below the polarization layer 830, the polarization layer 830, the optically clear adhesive layer 820, and the front plate 810 may be sequentially stacked on the top of the first substrate 840, and an optical sensor 890 may be disposed below the display 800. A sealing member 850 may be disposed between the first substrate 840 and the second substrate 860. An air layer 855 may be formed in an area other than the area in which the sealing member 850 is disposed between the first substrate 840 and the second substrate 860. An inorganic film, an organic film, and metal electrodes may be removed from an area corresponding to the optical sensor 890 on the second substrate 860.

According to various embodiments, the optical sensor 890 may be a sensor using light, such as, for example, and without limitation, an illuminance sensor, an IR sensor, a camera, a fingerprint sensor, or the like. When the proportion of the reflected light in the light received by the optical sensor 890 increases, the amount of light reaching the optical sensor 890 may decrease. The light incident from the outside may be reflected not only from the face of the front plate 810, but also from the interfaces of respective layers of the display panel.

According to various embodiments, in an area corresponding to the optical sensor 890, each of the polarization layer 830 and the optically clear adhesive layer 820 may include an opening, and the first air layer 825 may be formed in the opening.

Referring to FIGS. 8A and 8B, the light incident from the outside may be reflected at the interface between the first substrate 840 and the first air layer 825, and may be reflected from a face facing the second substrate 860 and the optical sensor 890. A first anti-reflection (AR) coating layer 871 may be formed on the face of the first substrate 840 facing the first air layer 825, and a second AR coating layer 872 may be formed on the face of the second substrate 860 facing the optical sensor 890. The AR coating layers may cancel lights reflected from both sides of each of them. The first AR coating layer 871 may be coated on the upper portion of the first substrate 840 to be in contact with the polarization layer 830 and the first air layer 825.

According to various embodiments, the first AR coating layer 871 and the second AR coating layer 872 may be disposed only in areas corresponding to the optical sensor 890. The first AR coating layer 871 may be disposed in an area corresponding to the optical sensor 890, and may be disposed between the first substrate 840 and the first air layer 825. The second AR coating layer 872 may be disposed in an area corresponding to the optical sensor 890 on the face of the second substrate 860 facing the optical sensor 890.

According to various embodiments, the first AR coating layer 871 may be disposed in an area corresponding to the optical sensor 890, and may be disposed by extending an edge of the area corresponding to the optical sensor 890. The first AR coating layer 871 may be disposed between the first substrate 840 and the first air layer 825, and a part of the first AR coating layer 871 may extend to the polarization layer around the first air layer 825. The second AR coating layer 872 may be disposed to extend around the area corresponding to the optical sensor 890 or the area corresponding to the optical sensor 890 on the face of the second substrate 860 facing the optical sensor 890.

Referring to FIG. 8C, the AR coating layer may include a first AR coating layer 871a, a second AR coating layer 871b, a third AR coating layer 872a, and a fourth AR coating layer 872b. The first AR coating layer 871a may be disposed between the first substrate 840 and the polarization layer 830. External light passing through the front plate 810 and reaching the surface of the first substrate 840 may not be reflected by the first AR coating layer 871a. The second AR coating layer 871b may be disposed between the first substrate 840 and the second air layer 855. The second AR coating layer 871b may prevent and/or reduce the reflection of the external light passing through the first substrate 840.

According to various embodiments, the third AR coating layer 872a may be disposed between the second air layer 855 and the second substrate 860. The third AR coating layer 872a may prevent and/or reduce the reflection of external light at the interface between the second substrate 860 and the second air layer 855.

According to various embodiments, the fourth AR coating layer 872b may be disposed on the surface of the second substrate 860 facing the optical sensor 890. The fourth AR coating layer 872b may prevent and/or reduce the reflection of external light passing through the second substrate 860.

According to various embodiments, the first AR coating layer 871a, the second AR coating layer 871b, the third AR coating layer 872a, and the fourth AR coating layer 872b may be disposed in areas corresponding to the optical sensor 890.

Figure 9A:
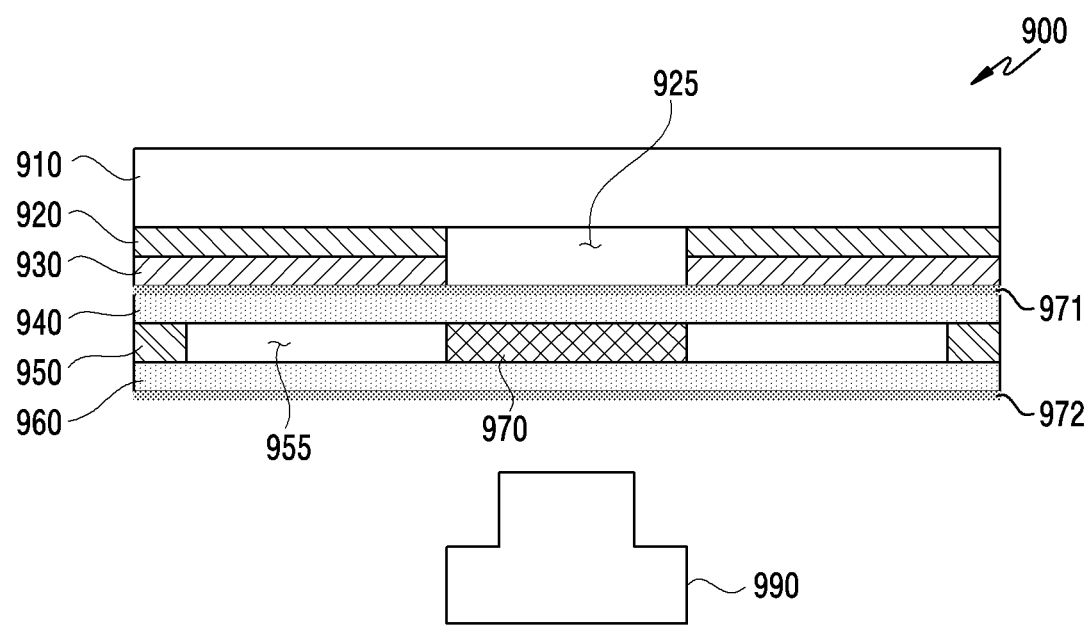
FIG. 9A is a sectional view illustrating an example in which an AR coating layer and a light-transmissive member are added to a display panel according to various embodiments.
Figure 9B:
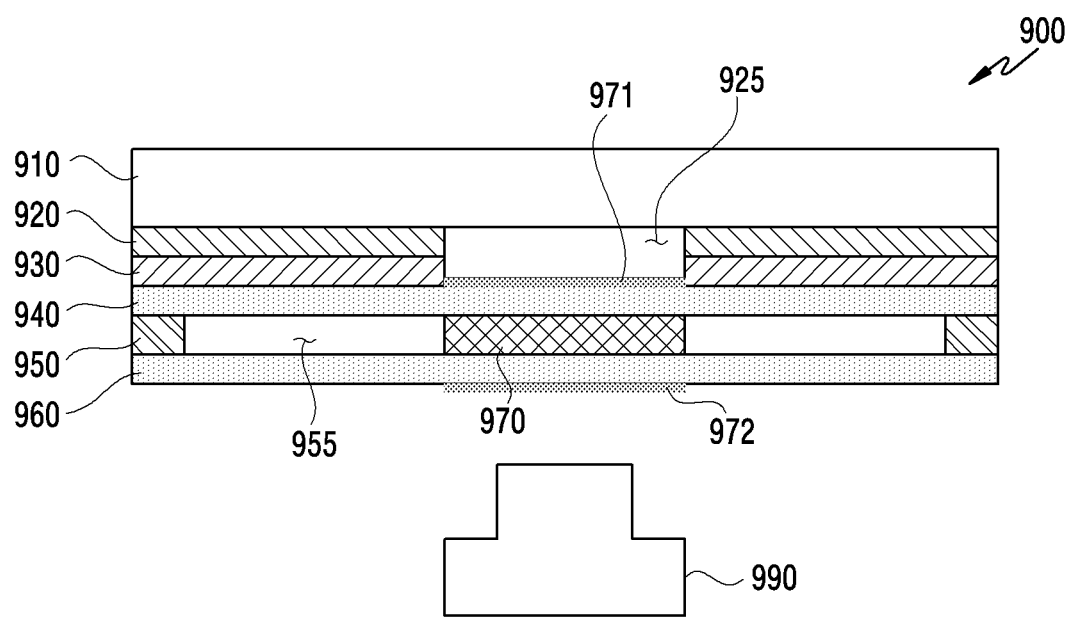
FIG. 9B is a sectional view illustrating an example in which an AR coating layer and a light-transmissive member are added to a display panel according to various embodiments.
Figure 9C:
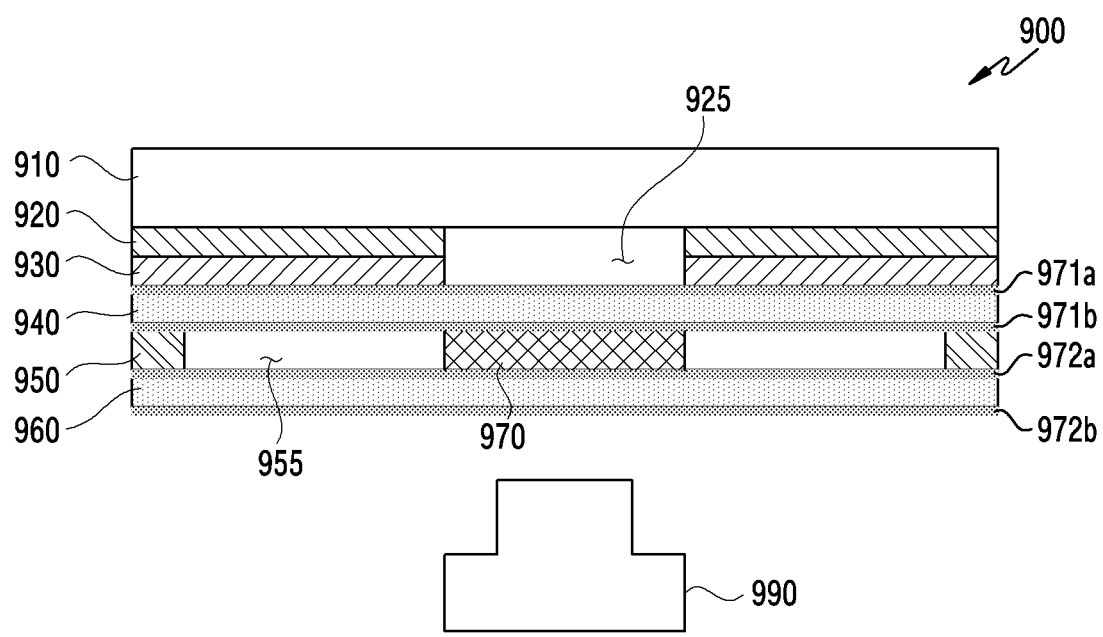
FIG. 9C is a sectional view illustrating an example in which an AR coating layer and a light-transmissive member are added to a display panel according to various embodiments.

FIG. 9A is a sectional view illustrating an example in which an AR coating layer and a light-transmissive member are added to a display panel according to various embodiments, FIG. 9B is a sectional view illustrating an example in which an AR coating layer and a light-transmissive member are added to a display panel according to various embodiments, and FIG. 9C is a sectional view illustrating an example in which an AR coating layer and a light-transmissive member are added to a display panel according to various embodiments.

Referring to FIG. 9A, a display 900 may include a front plate 910, an optically clear adhesive layer 920, a polarization layer 930, a first substrate 940, and a second substrate 960.

According to various embodiments, the first substrate 940 and the second substrate 960 may be disposed below the polarization layer 930, the polarization layer 930, the optically clear adhesive layer 920, and the front plate 910 may be sequentially stacked on the top of the first substrate 940, and an optical sensor 990 may be disposed below the display 900. A sealing member 950 may be disposed between the first substrate 940 and the second substrate 960. An air layer 955 may be formed in an area other than the area in which the sealing member 950 is disposed between the first substrate 940 and the second substrate 960. In an area corresponding to the optical sensor 990 on the second substrate 960, an inorganic film, an organic film, and metal electrodes may be removed.

According to various embodiments, the optical sensor 990 may be a sensor using light, such as, for example, and without limitation, an illuminance sensor, an IR sensor, a camera, a fingerprint sensor, or the like. When the proportion of the reflected light in the light received by the optical sensor 990 increases, the amount of light reaching the optical sensor 990 may decrease. The light incident from the outside may be reflected not only from the surface of the front plate 910, but also from the interfaces of respective layers of the display panel.

According to various embodiments, in an area corresponding to the optical sensor 990, each of the polarization layer 930 and the optically clear adhesive layer 920 may include an opening, and the first air layer 925 may be formed in the opening.

According to various embodiments, the display 900 may further include a light-transmissive member 970 between the first substrate 940 and the second substrate 960. The light-transmissive member 970 may be formed of a material having a refractive index corresponding to the refractive indices of the first substrate 940 and the second substrate 960. When external light passes through the display panel, the light transmittance of the display panel may be maintained high.

According to various embodiments, the display 900 may include a first AR coating layer 971 between the first substrate 940 and the polarization layer 930, and a second AR coating layer 972 may be formed on the face of the second substrate 960 facing the optical sensor 990.

Referring to FIG. 9B, the display of FIG. 9B differs from the display of FIG. 9A in terms of the structures of the first AR coating layer 971 and the second AR coating layer 972. The first AR coating layer 971 may be disposed between the first substrate 940 and the first air layer 925, and the second AR coating layer 972 may be disposed in an area overlapping the optical sensor 990 in the face of the second substrate facing the optical sensor 990.

According to various embodiments, the first substrate 940 and the second substrate 960 forming the display panel include a light-transmissive member 970 therein, and the first AR coating layer 971 and the second AR coating layer 972 may be formed on areas in contact with air on the outer faces of the first substrate 940 and the second substrate 960, so that reflectance is not high and transmittance may be increased.

Referring to FIG. 9C, the AR coating layer may include a first AR coating layer 971a, a second AR coating layer 971b, a third AR coating layer 972a, and a fourth AR coating layer 972b. The first AR coating layer 971a may be disposed between the first substrate 940 and the polarization layer 930. The first AR coating layer 971a may prevent and/or reduce the reflection of external light passing through the front plate 910 and reaching the surface of the first substrate 940. The second AR coating layer 971b may be disposed between the first substrate 940 and the second air layer 955. The second AR coating layer 971b may prevent and/or reduce the reflection of the external light passing through the first substrate 940.

According to various embodiments, the third AR coating layer 972a may be disposed between the second air layer 955 and the second substrate 960. The third AR coating layer 972a may prevent and/or reduce the reflection of external light at the interface between the second substrate 960 and the second air layer 955.

According to various embodiments, the fourth AR coating layer 972b may be disposed on the surface of the second substrate 960 facing the optical sensor 990. The fourth AR coating layer 972b may prevent and/or reduce the reflection of external light passing through the second substrate 960.

Figure 10A:
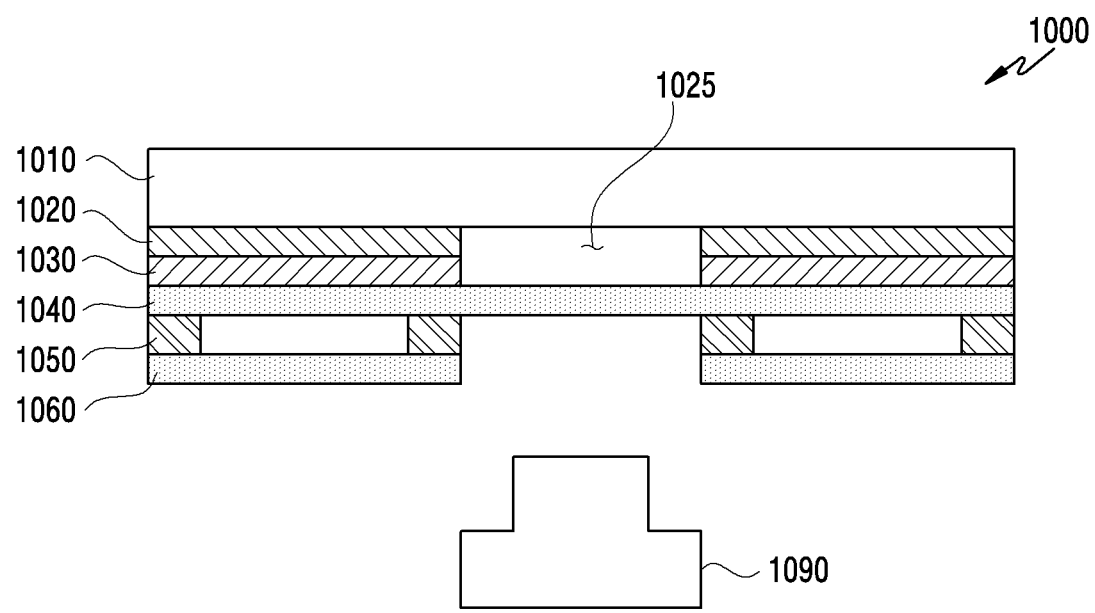
FIG. 10A is a sectional view illustrating an example in which substrates of a display panel are modified according to various embodiments.
Figure 10B:
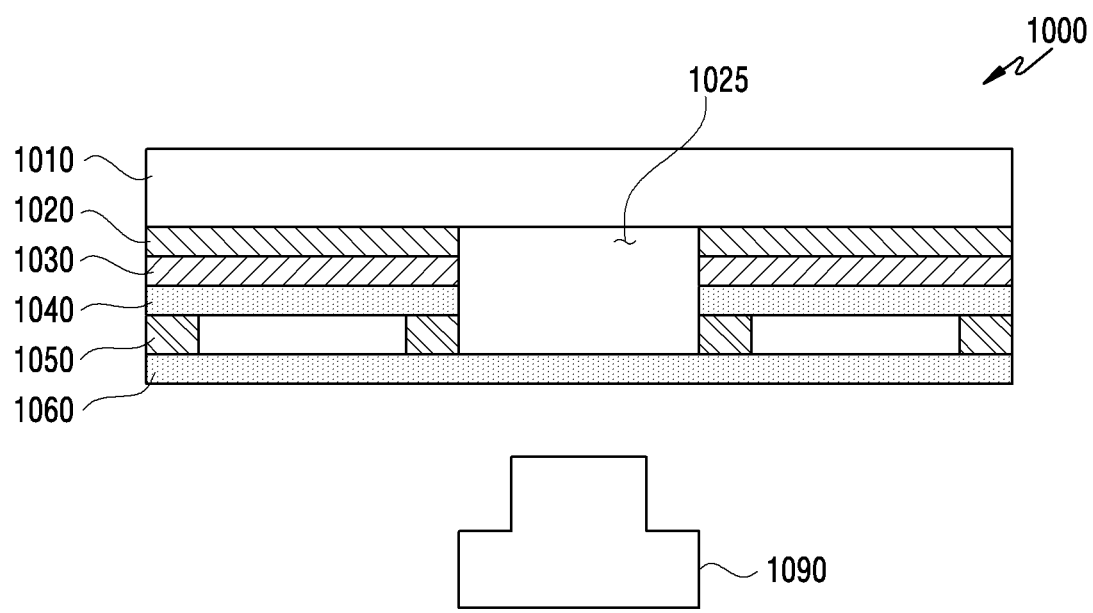
FIG. 10B is a sectional view illustrating an example in which substrates of a display panel are modified according to various embodiments.
Figure 10C:
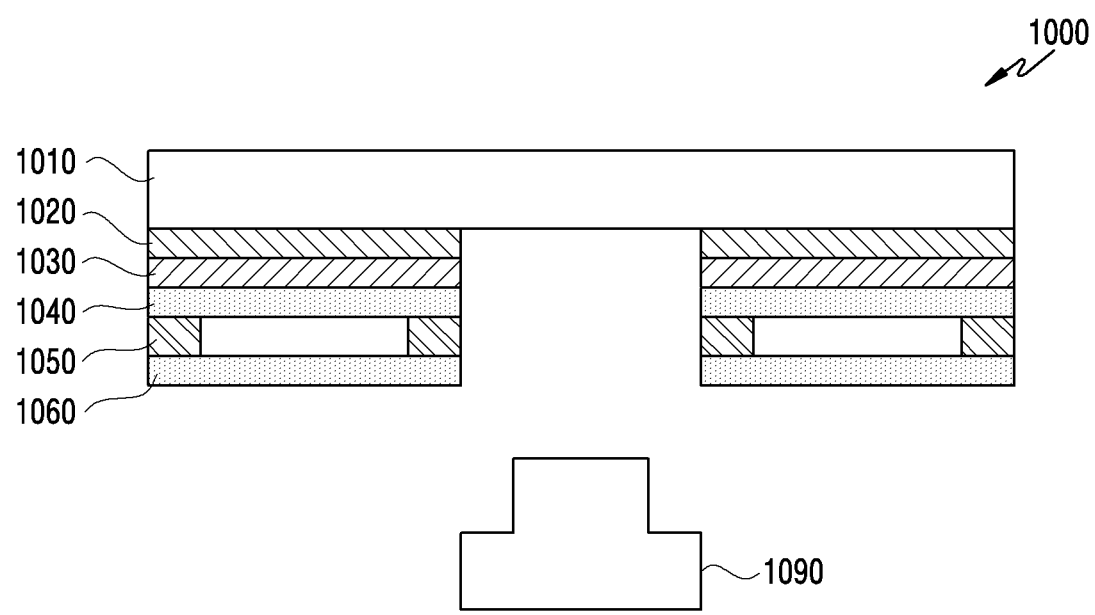
FIG. 10C is a sectional view illustrating an example in which substrates of a display panel are modified according to various embodiments.

FIG. 10A is a sectional view illustrating an example in which substrates of a display panel are modified according to various embodiments, FIG. 10B is a sectional view illustrating an example in which substrates of a display panel are modified according to various embodiments, and FIG. 10C is a sectional view illustrating an example in which substrates of a display panel are modified according to various embodiments.

Referring to FIG. 10A, a display 1000 may include a front plate 1010, an optically clear adhesive layer 1020, a polarization layer 1030, a first substrate 1040, and a second substrate 1060.

According to various embodiments, the first substrate 1040 and the second substrate 1060 may be disposed below the polarization layer 1030, the polarization layer 1030, the optically clear adhesive layer 1020, and the front plate 1010 may be sequentially stacked on the top of the first substrate 1040, and an optical sensor 1090 may be disposed below the display 1000. A sealing member 1050 may be disposed between the first substrate 1040 and the second substrate 1060.

According to various embodiments, the optical sensor 1090 may be a sensor using light, such as an illuminance sensor, an IR sensor, a camera, or a fingerprint sensor. When the proportion of the reflected light in the light received by the optical sensor 1090 increases, the amount of light reaching the optical sensor 1090 may decrease. The light incident from the outside may be reflected not only from the face of the front plate 1010, but also from the interfaces of respective layers of the display panel.

According to various embodiments, each of the polarization layer 1030 and the optically clear adhesive layer 1020 may have an opening formed in an area overlapping the optical sensor 1090, and may include an air layer 1025.

According to various embodiments, the second substrate 1060 may include an opening formed in an area corresponding to the optical sensor 1090. The sealing member 1050 disposed between the first substrate 1040 and the second substrate 1060 may be additionally formed to correspond to the shape of the opening formed in the second substrate

1060. The sealing member 1050 may be formed of a material corresponding to the material of the first substrate 1040 and the second substrate 1060. The first substrate 1040 and the second substrate 1060 may be made of glass, and the sealing member 1050 may be made of frit glass and may be disposed by being printed on the first substrate 1040. The first substrate 1040 may be bonded to the second substrate 1060, and the sealing member 1050 may be cured to seal a space between the first substrate 1040 and the second substrate 1060.

According to various embodiments, the light incident from the outside may not pass through the second substrate 1060, thereby reducing the amount of reflection and improving the transmittance of the display 1000.

Referring to FIG. 10B, the first substrate 1040 may include an opening formed in an area corresponding to the optical sensor 1090. The sealing member 1050 disposed between the first substrate 1040 and the second substrate 1060 may be additionally formed to correspond to the shape of the opening formed in the first substrate 1040. The sealing member 1050 may be formed of a material corresponding to the material of the first substrate 1040 and the second substrate 1060.

According to various embodiments, the opening formed in the first substrate 1040 may correspond to the openings formed in the optically clear adhesive layer 1020, and may form one air layer 1025. The light incident from the outside may pass through the front plate 1010 and then pass through the second substrate 1060 to reach the optical sensor 1090.

According to various embodiments, the light incident from the outside may not pass through the second substrate 1060, thereby reducing the amount of reflection and improving the transmittance of the display 1000.

Referring to FIG. 10C, each of the first substrate 1040 and the second substrate 1060 may include an opening formed in an area corresponding to the optical sensor 1090. The first substrate 1040 and the second substrate 1060 may have an additionally formed sealing member 1050, and the sealing member 1050 may seal a space between the first substrate 1040 and the second substrate 1060. The sealing member 1050 may be formed of a material corresponding to the material of the first substrate 1040 and the second substrate 1060.

According to various embodiments, all layers other than the front plate 1010 may each include an opening in an area overlapping the optical sensor 1090. The light incident from the outside may be transmitted to the optical sensor 1090 through the front plate 1010. Since it is possible to eliminate the reflection occurring at the interfaces of respective layers of the display panel, it is possible to increase the amount of light reaching the optical sensor 1090.

Figure 11A:
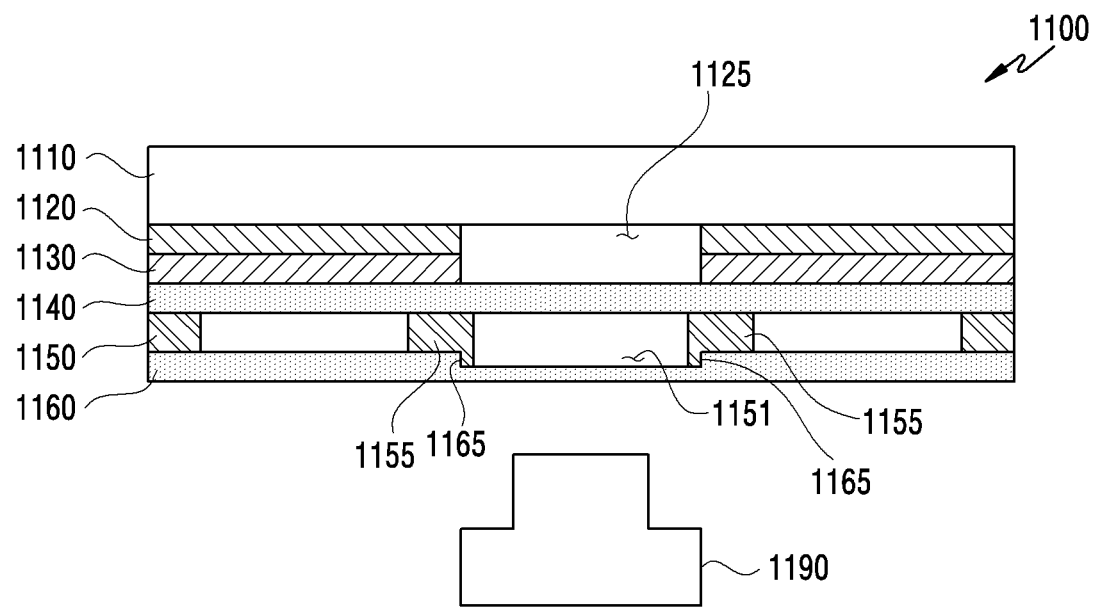
FIG. 11A is a sectional view illustrating an example in which a stepped portion is formed in a part of a display panel according to various embodiments.
Figure 11B:
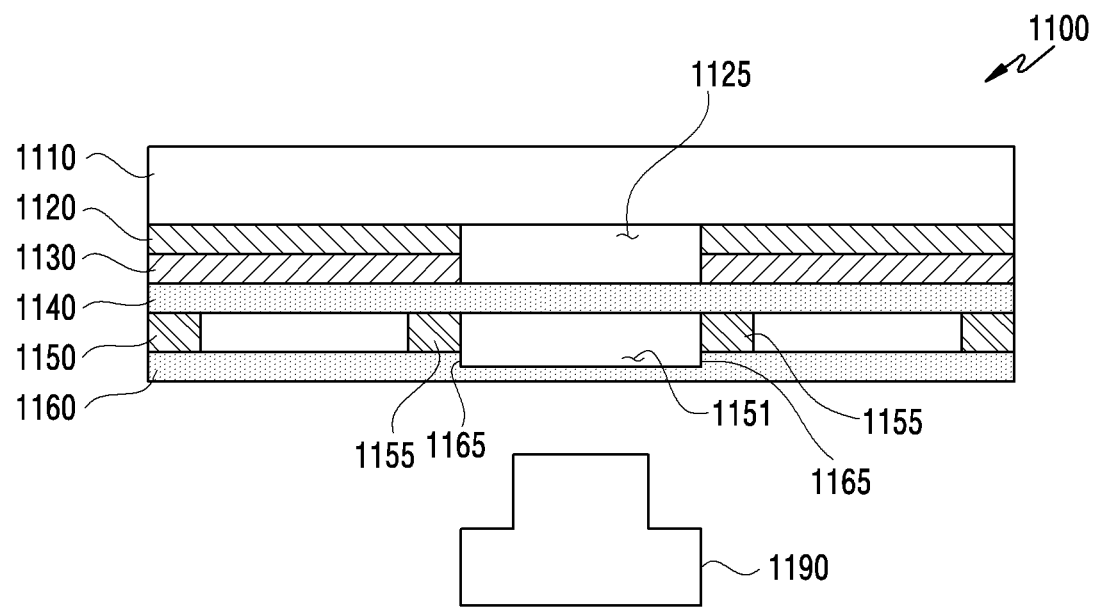
FIG. 11B is a sectional view illustrating an example in which a stepped portion is formed in a part of a display panel according to various embodiments.

FIG. 11A is a sectional view illustrating an example in which a stepped portion is formed in a part of a display panel according to various embodiments, and FIG. 11B is a sectional view illustrating an example in which a stepped portion is formed in a part of a display panel according to various embodiments.

Referring to FIG. 11A, a display 1100 may include a front plate 1110, an optically clear adhesive layer 1120, a polarization layer 1130, a first substrate 1140, and a second substrate 1160.

According to various embodiments, the first substrate 1140 and the second substrate 1160 may be disposed below the polarization layer 1130, the polarization layer 1130, the optically clear adhesive layer 1120, and the front plate 1110 may be sequentially stacked on the top of the first substrate 1140, and an optical sensor 1190 may be disposed below the display 1100. A sealing member 1150 may be disposed between the first substrate 1140 and the second substrate 1160.

According to various embodiments, the second substrate 1160 may include multiple thin film layers, and may prevent and/or reduce the reflection from occurring in each layer by removing layers having different refractive indices. In the second substrate 1160, a layer having a different refractive index may be removed from an area corresponding to the optical sensor 1190, and a stepped portion 1165 may be formed at the boundary of the area corresponding to the optical sensor 1190. An additional sealing member 1155 may be disposed along the boundary of the stepped portion 1165. The light incident from the outside may be reflected in the layers that are in contact with a first air layer 1125 and a second air layer 1151, and may be reflected at the interfaces of respective layers. According to various embodiments, if the thin films of the second substrate 1165, having different refractive indices, are removed, it is possible to reduce the reflection of external light, incident on the second substrate 1165, from the second substrate 1165, and to improve the transmittance of the incident light. According to various embodiments, each of the first substrate 1140 and the second substrate 1160 may be a multi-layered substrate or a single-layered substrate. Each of the first substrate 1140 and the second substrate 1160 may be formed as a single-layer substrate and may be thin in an area corresponding to the optical sensor 1190.

According to various embodiments, the stepped portion 1165 of the second substrate 1165 may be formed on a face to be in contact with the second air layer 1151, and may be formed on the face facing the optical sensor 1190.

According to various embodiments, the stepped portion may be formed on the face of the first substrate 1140 to be in contact with the second air layer 1151 or on the face of the first substrate 1140 to be in contact with the first air layer 1125.

According to various embodiments, the stepped portion may be formed on both the first substrate 1140 and the second substrate 1160, or may be formed on only one of the first substrate 1140 and the second substrate 1160.

Referring to FIG. 11B, the second sealing member 1155 may be formed only on the upper portion of the stepped portion 1165 of the second substrate 1160. Since the second sealing member 1155 is not formed in the area overlapping the optical sensor 1190, a material causing reflection, such as the sealing member 1155, may not be disposed in a space that may be used as a path of light incident from the outside.

Figure 12:
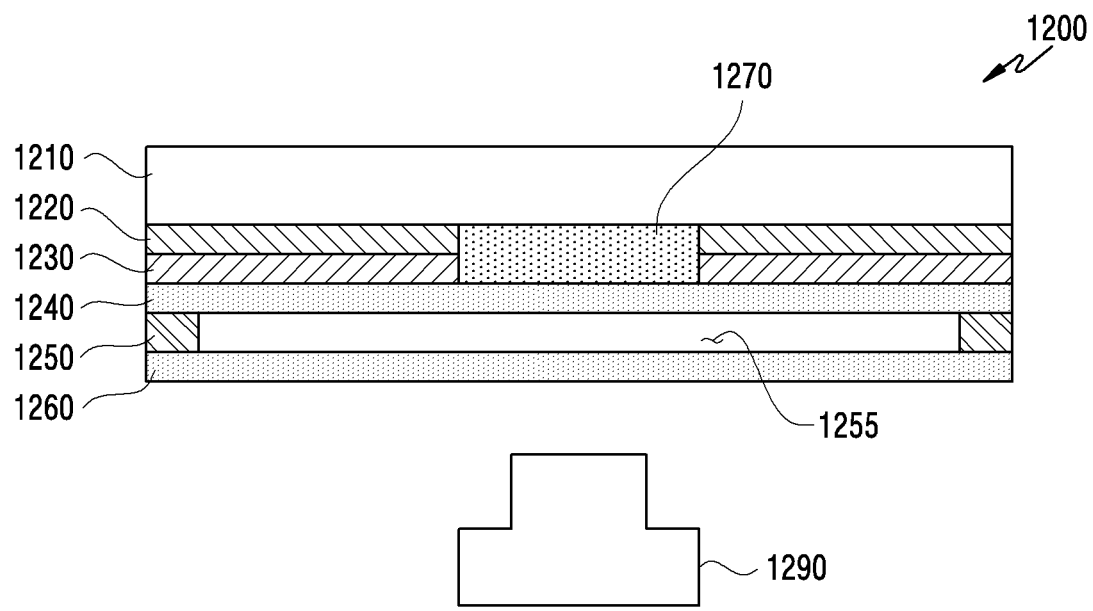
FIG. 12 is a sectional view illustrating an example in which a light-transmissive member is added to a display according to various embodiments.
Figure 13:
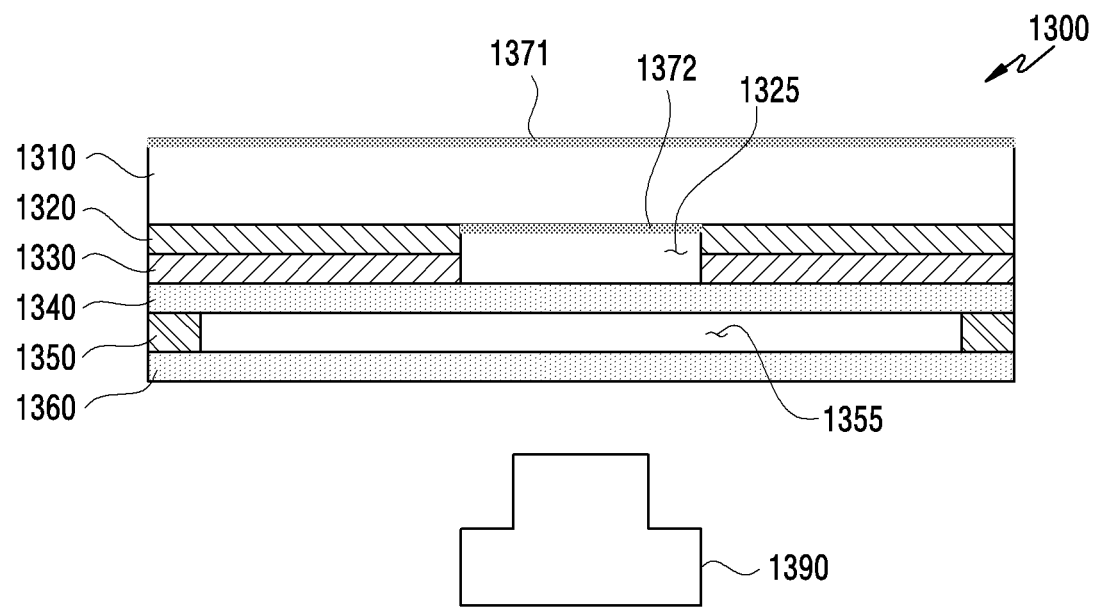
FIG. 13 is a sectional view illustrating a coating layer formed on a front plate portion in a display according to various embodiments.

FIG. 12 is a sectional view illustrating an example in which a light-transmissive member is added to a display according to various embodiments. FIG. 13 is a sectional view illustrating a coating layer formed on a front plate portion in a display according to various embodiments.

Referring to FIG. 12, a display 1200 may include a front plate 1210, an optically clear adhesive layer 1220, a polarization layer 1230, a first substrate 1240, and a second substrate 1260.

According to various embodiments, the first substrate 1240 and the second substrate 1260 may be disposed below the polarization layer 1230, the polarization layer 1230, the optically clear adhesive layer 1220, and the front plate 1210 may be sequentially stacked on the top of the first substrate 1240, and an optical sensor 1290 may be disposed below the display 1200. A sealing member 1250 may be disposed between the first substrate 1240 and the second substrate 1260. An air layer 1255 may be formed between the first substrate 1240 and the second substrate 1260.

According to various embodiments, in the polarization layer 1230 and the optically clear adhesive layer 1220, an area corresponding to the optical sensor 1290 may be removed, and a light-transmissive member 1270 may be disposed in the removed area. The polarization layer 1230 and the optically clear adhesive layer 1220 may be removed through patterning. The light-transmissive member 1270 may be formed of a material having a refractive index corresponding to the refractive indices of the front plate 1210, the first substrate 1240, and the second substrate 1260.

The light-transmissive member 1270 having a refractive index corresponding to the refractive indices of the front plate 1210, the first substrate 1240, and the second substrate 1260 may reduce the amount of the light incident from the outside and reflected from the opposite faces of the light-transmissive member 1270.

Referring to FIG. 13, a display 1300 may include a front plate 1310, an optically clear adhesive layer 1320, a polarization layer 1330, a first substrate 1340, and a second substrate 1360.

According to various embodiments, the first substrate 1340 and the second substrate 1360 may be disposed below the polarization layer 1330, the polarization layer 1330, the optically clear adhesive layer 1320, and the front plate 1310 may be sequentially stacked on the top of the first substrate 1340, and an optical sensor 1390 may be disposed below the display 1300. A sealing member 1350 may be disposed between the first substrate 1340 and the second substrate 1360. An air layer 1355 may be formed between the first substrate 1340 and the second substrate 1360. Each of the polarization layer 1330 and the optically clear adhesive layer 1320 may have an opening in an area overlapping the optical sensor 1390, and a second air layer 1325 may be formed in the opening.

According to various embodiments, a first AR coating layer 1371 may be formed on the outer face of the front plate 1310, and a second AR coating layer 1372 may be formed in the inner face of the front plate 1310 in an area corresponding to the optical sensor 1390.

According to various embodiments, since the AR coating layers 1371 and 1372 are formed on the opposite faces of the front plate 1310, it is possible to reduce the reflection of the light transmitted to the optical sensor 1390, and to increase the amount of light transmitted to the optical sensor 1390.

The electronic device according to various embodiments is capable of increasing the transmittance by reducing reflection occurring at the interfaces of respective layers forming the display panel disposed above an optical sensor.

The electronic device according to various embodiments is capable of increasing the light transmittance of the sensor mounted on the front face thereof, thereby reducing the power consumption of the sensor mounted on the front face.

An electronic device according to various example embodiments may include an optical sensor (e.g., the optical sensor 490 in FIG. 4B) and a display panel (e.g., the first substrate 440 in FIG. 4B and the second substrate 460 in FIG. 4B). The display panel may include a first substrate (e.g., the first substrate 440 in FIG. 4B), a second substrate (e.g., the second substrate 460 in FIG. 4B), a pixel layer (e.g., the pixel layer 380 in FIG. 3B) disposed between the first substrate and the second substrate, the pixel layer having at least one opening formed in at least a portion thereof, and a light-transmissive member (e.g., the light-transmissive member 470 in FIG. 4B) comprising a light-transmissive material disposed in at least a portion of the opening, the light-transmissive member having a second reflective index corresponding to the first reflective index of the second substrate. The optical sensor may be disposed below the second substrate to at least partially overlap a predetermined area of the display panel corresponding to the opening.

According to various example embodiments, the display panel may include at least one partition disposed between the light-transmissive member and the pixel layer.

According to various embodiments, the partition may have at least one passage formed therein such that at least a part of the light-transmissive member is movable through the passage.

According to various example embodiments, the at least one partition may include a first partition (e.g., the first partition 476 in FIG. 7) and a second partition (e.g., the second partition 477 in FIG. 7) disposed around the first partition, and the first partition may be spaced apart from at least the first substrate or the second substrate.

According to various example embodiments, the display panel may include an anti-reflection (AR) coating layer (e.g., the first AR coating layer 871 or the second AR coating layer 872 in FIG. 8A) comprising an AR material disposed in an area including the predetermined area of the display panel corresponding to the opening.

According to various example embodiments, the partition may surround the light-transmissive member.

According to various example embodiments, the at least one partition may include a first partition disposed on the first substrate and a second partition disposed on the second substrate facing the first partition and spaced apart from the first partition.

According to various example embodiments, the light-transmissive member may comprise a viscous material.

According to various example embodiments, the electronic device may further include a second polarization layer (e.g., the polarization layer 430 in FIG. 4B) disposed on the first substrate, an optically clear adhesive (OCA) layer (e.g., the optically clear adhesive layer 420 in FIG. 4B) disposed on the polarization layer, and a transparent plate (e.g., the front plate 410 in FIG. 4B) disposed on the optically clear adhesive layer.

According to various example embodiments, each of the optically clear adhesive layer and the polarization layer may include an opening (e.g., the first air layer 425 in FIG. 5) in an area overlapping the optical sensor.

According to various example embodiments, the area overlapping the optical sensor in the polarization layer (e.g., the area 431 corresponding to the optical sensor in FIG. 4C) may include a non-polarization characteristic.

According to various example embodiments, the anti-reflection coating layer may include an external coating layer (e.g., the first coating layer 871*a* in FIG. 8C or the fourth coating layer 872*b* in FIG. 8C) disposed on one face of each of the first substrate and the second substrate.

According to various embodiments, the anti-reflection coating layer may include an internal coating layer (e.g., the second coating layer 871*b* in FIG. 8C or the third coating layer 872*a* in FIG. 8C) disposed on a face of each of the first substrate and the second substrate other than a face on which the external coating layer is disposed.

An electronic device according to various example embodiments may include a display panel (e.g., the first substrate 440 in FIG. 4B or the second substrate 460 in FIG. 4B), a polarization layer (e.g., the polarization layer 430 in FIG. 4B) disposed on one face of the display panel, an optically clear adhesive (OCA) layer (e.g., the optically clear adhesive layer 420 in FIG. 4B) disposed on the polarization layer, a transparent plate (e.g., the front plate 410 in FIG.

4B) disposed on the optically clear adhesive layer, and an optical sensor (e.g., the optical sensor 490 in FIG. 4B). The display panel may include a first substrate (e.g., the first substrate 440 in FIG. 4B), a second substrate (e.g., the second substrate 460 in FIG. 4B) facing the first substrate, a pixel layer (e.g., the pixel layer 380 in FIG. 3B) disposed between the first substrate and the second substrate and having at least one opening formed in at least a portion overlapping the optical sensor, and an anti-reflection (AR) layer comprising an AR material (e.g., the first AR coating layer 871 or the second AR coating layer 872 in FIG. 8A) disposed in an area corresponding to the opening. The optical sensor may be disposed below the second substrate and at least partially overlap a predetermined area of the display panel corresponding to the opening.

According to various example embodiments, the display panel may include a light-transmissive member comprising a light-transmissive material (e.g., the light-transmissive member 420 in FIG. 4B) disposed in at least a portion of the opening, the light-transmissive member having a second reflective index corresponding to a first reflective index of the second substrate.

According to various example embodiments, at least one of the first substrate and the second substrate may include an opening corresponding to the opening in the pixel layer.

According to various example embodiments, an edge of the opening formed in the at least one of the first substrate and the second substrate may include a seal (e.g., the sealing member 1050 in FIG. 10A) configured to seal a space between the first substrate and the second substrate.

According to various example embodiments, each of the optically clear adhesive layer and the polarization layer may include an opening in an area overlapping the optical sensor.

According to various example embodiments, the electronic device may further include a light-transmissive member comprising a light-transmissive material (the light-transmissive member 1270 in FIG. 12) disposed in the opening in each of the optically clear adhesive layer and the polarization layer, the light-transmissive member having a second reflective index corresponding to a first reflective index of the second substrate.

According to various example embodiments, the anti-reflection coating layer may be stacked on at least one face of the transparent plate.

While the disclosure has been illustrated and described with reference to various example embodiments thereof, it will be understood by those skilled in the art that various changes in form and details may be made therein without departing from the scope of the disclosure.

What is claimed is:

1. An electronic device comprising:
   a display panel;
   a polarization layer disposed on one face of the display panel;
   an optically clear adhesive (OCA) layer disposed on the polarization layer;
   a transparent plate disposed on the optically clear adhesive layer;
   a light-transmissive member comprising a light-transmissive material; and
   an optical sensor disposed below the display panel,
   wherein the display panel includes:
      a first substrate;
      a second substrate; and
      a pixel layer disposed between the first substrate and the second substrate, the pixel layer including a first opening in at least a portion of the pixel layer overlapping the optical sensor,
   wherein the optical sensor is disposed below at least the second substrate and at least partially overlapping a predetermined area of the display panel corresponding to the first opening,
   wherein the polarization layer includes a second opening in at least a portion of the polarization layer overlapping the optical sensor,
   wherein the optically clear adhesive layer includes a third opening in at least a portion of the optically clear adhesive layer overlapping the optical sensor, and
   wherein the light-transmissive member is disposed in an area corresponding to the second opening and the third opening.

2. The electronic device of claim 1, wherein the light-transmissive member comprises a viscous material.

3. The electronic device of claim 1, wherein an area overlapping the optical sensor in the polarization layer has a non-polarization characteristic.

4. The electronic device of claim 1, wherein the polarization layer directly contacts the optically clear adhesive layer.

5. The electronic device of claim 1, wherein the light transmissive member directly contacts the first substrate.

6. The electronic device of claim 1, wherein the transparent plate directly contacts the optically clear adhesive layer.

7. The electronic device of claim 1, wherein the display panel includes an anti-reflection (AR) coating layer comprising an AR material disposed in an area including the predetermined area of the display panel corresponding to the first opening.

8. The electronic device of claim 7, wherein the anti-reflection coating layer includes an external coating layer disposed on one face of each of the first substrate and the second substrate.

9. The electronic device of claim 8, wherein the anti-reflection coating layer includes an internal coating layer disposed on a face of each of the first substrate and the second substrate other than the one face on which the external coating layer is disposed.

10. An electronic device comprising:
    a display panel;
    a polarization layer disposed on one face of the display panel;
    an optically clear adhesive (OCA) layer disposed on the polarization layer;
    a transparent plate disposed on the optically clear adhesive layer; and
    an optical sensor,
    wherein the display panel includes:
       a first substrate;
       a second substrate facing the first substrate;
       a pixel layer disposed between an interior surface of the first substrate and an interior surface of the second substrate, the pixel layer including an opening in at least a portion of the pixel layer overlapping the optical sensor; and
       an anti-reflection (AR) layer comprising an AR material disposed in an area corresponding to the opening and on an exterior surface of the first substrate opposite to the interior surface of the first substrate and/or on an exterior surface of the second substrate opposite to the interior surface of the second substrate, wherein the optical sensor is disposed below the second substrate and at least partially overlapping a predetermined area of the display panel corresponding to the opening.

11. The electronic device of claim 10, wherein the display panel includes a light-transmissive member comprising a light-transmissive material disposed in at least a portion of the opening, the light-transmissive member having a second reflective index corresponding to a first reflective index of the second substrate.

12. The electronic device of claim 10, wherein an anti-reflection coating layer is stacked on at least one face of the transparent plate.

13. The electronic device of claim 10,
wherein the opening is a first opening, and
wherein at least one of the first substrate and the second substrate includes a second opening corresponding to the first opening in the pixel layer.

14. The electronic device of claim 13, wherein
an edge of the second opening includes a seal configured to seal a space between the first substrate and the second substrate.

15. The electronic device of claim 10, wherein each of the optically clear adhesive layer and the polarization layer each include an opening in an area overlapping the optical sensor.

16. The electronic device of claim 15, further comprising:
a light-transmissive member comprising a light-transmissive material disposed in the opening in each of the optically clear adhesive layer and the polarization layer, the light-transmissive member having a second reflective index corresponding to a first reflective index of the second substrate.

* * * * *